US012719604B2

(12) United States Patent
Lee et al.

(10) Patent No.: US 12,719,604 B2
(45) Date of Patent: Aug. 25, 2026

(54) METHOD AND APPARATUS FOR PERFORMING DECODING BASED ON FANO DECODING

(71) Applicant: SAMSUNG ELECTRONICS CO., LTD., Suwon-si (KR)

(72) Inventors: Donghun Lee, Suwon-si (KR); Seho Myung, Suwon-si (KR); Kwonjong Lee, Suwon-si (KR); Min Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 18/612,995

(22) Filed: Mar. 21, 2024

(65) Prior Publication Data

US 2024/0322937 A1 Sep. 26, 2024

(30) Foreign Application Priority Data

Mar. 24, 2023 (KR) ........................ 10-2023-0038935

(51) Int. Cl.
*H04L 1/18* (2023.01)
*H04L 1/00* (2006.01)
*H04L 25/06* (2006.01)

(52) U.S. Cl.
CPC .......... *H04L 1/0003* (2013.01); *H04L 1/0009* (2013.01); *H04L 25/067* (2013.01)

(58) Field of Classification Search
None
See application file for complete search history.

(56) References Cited

U.S. PATENT DOCUMENTS

| | | | | |
|---|---|---|---|---|
| 5,014,275 | A | 5/1991 | Shimoda et al. | |
| 6,701,483 | B1 | 3/2004 | Heegard et al. | |
| 9,628,113 | B2 | 4/2017 | Jeong et al. | |
| 10,574,273 | B1 * | 2/2020 | Rottela | H04L 25/067 |
| 10,784,899 | B2 * | 9/2020 | Khude | H03M 13/1111 |

(Continued)

FOREIGN PATENT DOCUMENTS

| | | |
|---|---|---|
| CN | 107124249 | 9/2017 |
| JP | 2531533 B2 | 9/1996 |

(Continued)

*Primary Examiner* — Mujtaba M Chaudry

(57) ABSTRACT

The present disclosure relates to a 5G communication system or a 6G communication system for supporting higher data rates beyond a 4G communication system such as long term evolution (LTE). A method performed by a receiving node in a wireless communication system is provided. The method comprises receiving, from a transmitting node, a codeword comprising at least one information bit, estimating a bit value of a first information bit of the at least one information bit as a first estimation bit value, and determining whether a log-likelihood ratio (LLR) indicating a probability ratio between bit values that are able to be estimated as the bit value of the first information bit is included in a first interval. In case that the LLR is included in the first interval, the method further comprises determining the bit value of the first information bit as a first estimation bit value or a second estimation bit value which is different from the first estimation bit value, by comparing a reliability value determined based on the LLR with at least one threshold.

11 Claims, 14 Drawing Sheets

(56) References Cited

U.S. PATENT DOCUMENTS 11,689,218 B2* 6/2023 Park .................... H03M 13/134 714/776
2002/0037059 A1 3/2002 Heegard et al.
2010/0098194 A1* 4/2010 Reial ..................... H04L 25/067 375/348
2014/0281823 A1* 9/2014 Micheloni .......... H03M 13/1111 714/773
2015/0263767 A1* 9/2015 Shin .................... H03M 13/134 714/796
2017/0149533 A1* 5/2017 Mejri ................ H04L 25/03203
2018/0145852 A1* 5/2018 Mejri ................ H04L 25/03891
2018/0191532 A1* 7/2018 Mejri ................ H04L 25/03242
2019/0245560 A1 8/2019 Yang et al.
2020/0358557 A1* 11/2020 Park .................... H03M 13/618
2020/0366317 A1* 11/2020 Myung ............. H03M 13/2792
2021/0297094 A1* 9/2021 Hamelin ........... H03M 13/2792
2024/0312552 A1* 9/2024 Steiner ................. G11C 29/024

FOREIGN PATENT DOCUMENTS

KR 10-2014-0077492 A 6/2014
KR 10-2158312 B1 9/2020

* cited by examiner

METHOD AND APPARATUS FOR PERFORMING DECODING BASED ON FANO DECODING

CROSS-REFERENCE TO RELATED APPLICATION(S)

This application is based on and claims priority under 35 U.S.C. § 119 to Korean Patent Application No. 10-2023-0038935, filed on Mar. 24, 2023, in the Korean Intellectual Property Office, the disclosure of which is incorporated by reference herein in its entirety.

BACKGROUND

1. Field

The disclosure relates to a wireless communication system (or, a mobile communication system). Specifically, the disclosure relates to a method and an apparatus for performing decoding based on Fano decoding.

2. Description of Related Art

Considering the development of wireless communication from generation to generation, the technologies have been developed mainly for services targeting humans, such as voice calls, multimedia services, and data services. Following the commercialization of 5G (5th generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bit per second (bps) and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz (THz) band (for example, 95 gigahertz (GHz) to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, Radio Frequency (RF) elements, antennas, novel waveforms having a better coverage than Orthogonal Frequency Division Multiplexing (OFDM), beamforming and massive Multiple-input Multiple-Output (MIMO), Full Dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, Orbital Angular Momentum (OAM), and Reconfigurable Intelligent Surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, High-Altitude Platform Stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of Artificial Intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as Mobile Edge Computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended Reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

SUMMARY

The disclosure relates to a receiving node that may receive a codeword from a transmitting node, and the receiving node may decode the codeword including information bits based on a log-likelihood ratio (LLR). For example, the receiving node may estimate a bit value of a first information bit included in the codeword, and obtain the LLR of the first information bit. Based on the obtained LLR, the receiving node may calculate a first reliability value P0 of a first estimation bit value (e.g., 0) or a second reliability value (P1) of a second estimation bit value (e.g., 1), and the receiving node may determine whether the estimation bit value is reliable as the first information bit value based on the calculated reliability value.

Considering characteristics of polarization-adjusted convolutional (PAC) Fano decoding that decodes a plurality of information bits in a search tree manner, a reliability test using reliability values calculated from the LLR may occur frequently. Hence, calculating the reliability values based on the LLR may be repeated every time the receiving node conducts the reliability test, and may result in high latency and a high block error rate (BLER).

According to an embodiment, a method is performed by a receiving node in a wireless communication system. The method may include receiving, from a transmitting node, a codeword including at least one information bit, estimating a bit value of a first information bit of the at least one information bit as a first estimation bit value, determining whether an LLR indicating a probability ratio between bit values that are able to be estimated as the bit value of the first information bit is included in a first interval, in case that the LLR is included in the first interval, determining the bit value of the first information bit as a first estimation bit value or a second estimation bit value which is different from the first estimation bit value, by comparing a reliability value determined based on the LLR with at least one threshold, and in case that the LLR is not included in the first interval, determining the bit value of the first information bit as the first estimation bit value or the second estimation bit value based on the LLR.

According to an embodiment, a receiving node in a wireless communication system may include a transceiver and a controller coupled with the transceiver. The controller may be configured to receive, from a transmitting node, a codeword including at least one information bit, estimate a bit value of a first information bit of the at least one information bit as a first estimation bit value, determine whether an LLR indicating a probability ratio between bit values that are able to be estimated as the bit value of the first information bit is included in a first interval, in case that the LLR is included in the first interval, determine the bit value of the first information bit as a first estimation bit value or a second estimation bit value which is different from the first estimation bit value, by comparing a reliability value determined based on the LLR with the at least one threshold, and in case that the LLR is not included in the first interval, determine the bit value of the first information bit as the first estimation bit value or the second estimation bit value based on the LLR.

According to an embodiment, the receiving node may reduce or minimize the latency and the BLER which may occur in the decoding process.

Besides the aforementioned embodiments, various effects obtained directly or indirectly through this document may be provided.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure will be described with reference to the accompanying drawings. However, it should be understood that the disclosure is not limited to specific embodiments, but rather includes various modifications, equivalents and/or alternatives of various embodiments of the disclosure.

Figure 1:
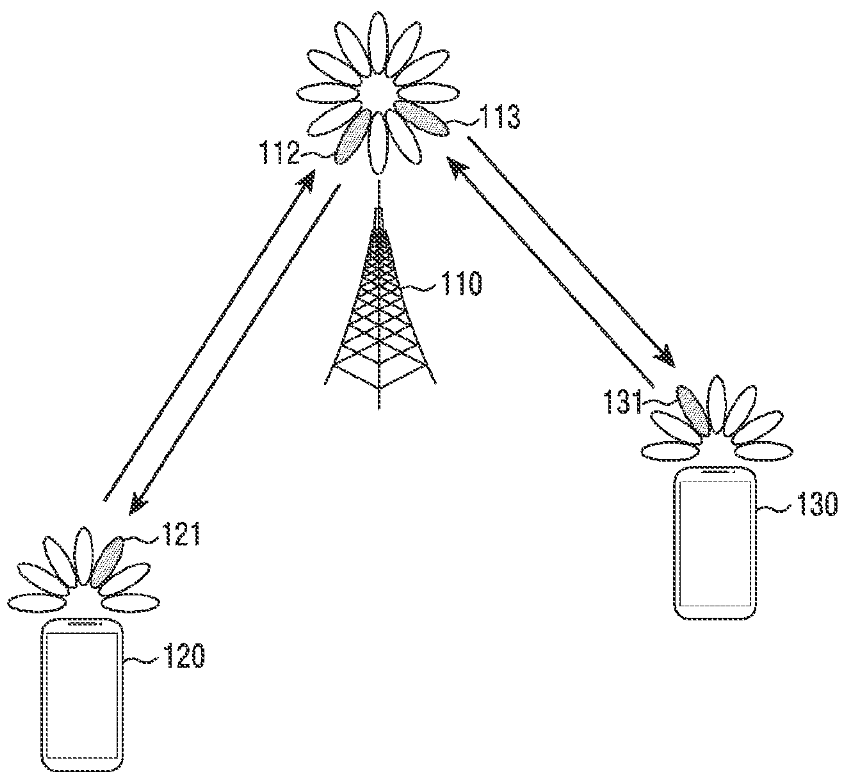
FIG. 1 illustrates a wireless communication system according to an embodiment of the disclosure.

FIG. 1 illustrates a wireless communication system according to an embodiment of the disclosure.

FIG. 1 illustrates a base station 110, a terminal 120, and/or a terminal 130, as some of nodes which use radio channels in the wireless communication system. FIG. 1 shows only one base station, but this is merely an example. The wireless communication system of FIG. 1 may further include another base station identical or similar to the base station 110.

The base station 110 is a network infrastructure which provides radio access to the terminals 120 and 130. The base station 110 has coverage defined as a specific geographic area based on a signal transmission distance. In addition to the base station, the base station 110 may be referred to as an 'access point (AP)', an 'eNodeB (eNB)', a 'gNodeB (gNB)', a '5th generation (5G) node', a 'wireless point', a 'transmission/reception point (TRP)' or other term having the equivalent technical meaning.

The first terminal 120 and the second terminal 130 each are used by a user, and may perform communication with the base station 110 over the radio channel. At least one of the first terminal 120 and the second terminal 130 may be operated without the user's involvement. For example, at least one of the first terminal 120 or the second terminal 130 may be a device which performs machine type communication (MTC), and may not be carried by the user. In addition to the terminal, the first terminal 120 and the second terminal 130 each may be referred to as a 'user equipment (UE)', a 'mobile station', a 'subscriber station', a 'customer premises equipment (CPE)', a 'remote terminal', a 'wireless terminal', an 'electronic device', a 'user device', or other term having the technically identical meaning.

The base station 110, the first terminal 120, and the second terminal 130 may transmit and/or receive a radio signal in a millimeter wave (mm Wave) band (e.g., 28 GHz, 30 GHZ, 38 GHz, 60 GHz). In so doing, to improve a channel gain, the base station 110, the first terminal 120, and/or the second terminal 130 may perform beamforming.

The beamforming may include transmit beamforming and/or receive beamforming. That is, the base station 110, the first terminal 120, and/or the second terminal 130 may give directivity to a transmit signal or a received signal. To give the directivity to the received signal, the base station 110 and/or the terminals 120 and 130 may select their serving beams 112, 113, 121, and 131 through a beam search or beam management procedure. After the serving beams 112, 113, 121, and 131 are selected, communication may be performed through resources which are quasi co-located (QCL) with resources transmitting the serving beams 112, 113, 121, and 131.

The base station 110, the first terminal 120, and the second terminal 130 of the disclosure each may be a transmitting apparatus, a transmitting node, a receiving apparatus, and/or a receiving node. For example, the base station 110 may transmit a radio frequency (RF) signal to the first terminal 120. The base station 110 may receive an RF signal from the first terminal 120. As another example, the first terminal 120 may transmit an RF signal to the base station 110 or the second terminal 130. The first terminal 120 may receive an RF signal from the base station 110 or the second terminal 130.

Figure 2:
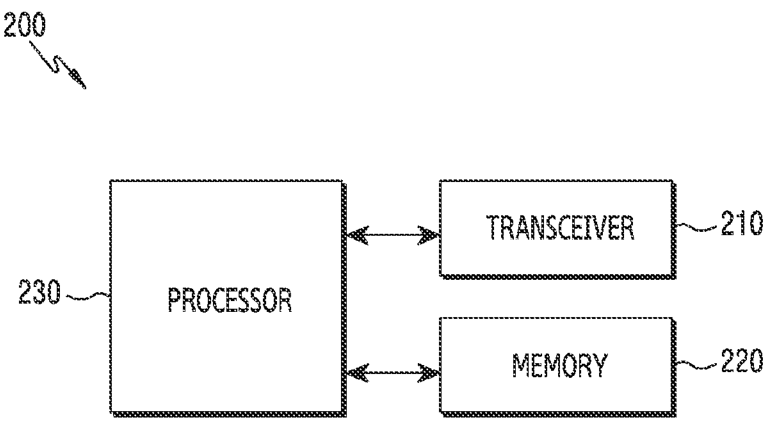
FIG. 2 illustrates a diagram of a structure of a terminal according to an embodiment of the disclosure.

FIG. 2 illustrates a diagram of a structure of a terminal according to an embodiment of the disclosure.

Referring to FIG. 2, a terminal 200 may include a transceiver 210, a memory 220 and/or a processor 230 according to an embodiment. The disclosure describes that the terminal 200 includes the transceiver 210, the memory 220 and/or the processor 230, but this is merely an example. For example, the terminal 200 may further include other component than the transceiver 210, the memory 220 and the processor 230.

According to an embodiment, the transceiver 210, the memory 220 and the processor 230 each may be implemented or formed as a separate chip. However, this is merely an example and the transceiver 210, the memory 220 and/or the processor 230 may be implemented or formed as a single chip.

According to an embodiment, the transceiver 210 may include at least one transmitter and/or at least one receiver. For example, the transceiver 210 may include an RF transmitter for amplifying and up-converting a frequency of a transmitted signal. The transceiver 210 may include an RF receiver for down-converting a frequency of a received signal and low-noise-amplifying the signal.

The components of the transceiver 210 explained in the disclosure are merely exemplary, and the components of the transceiver 210 are not limited to the RF transmitter and the RF receiver. For example, the transceiver 210 may further include a coupler for obtaining isolation between the RF transmitter and the RF receiver.

According to an embodiment, the transceiver 210 may transmit or receive a signal to or from the processor 230. For example, the transceiver 210 may transmit or deliver the RF signal received over the wireless communication channel to the processor 230. The transceiver 210 may receive an RF signal from the processor 230.

According to an embodiment, the transceiver 210 may be referred to as a UE transmitter or a UE receiver.

According to an embodiment, the transceiver 210 may transmit a signal to a base station (e.g., the base station 110 of FIG. 1) or a network entity (e.g., a user plane function (UPF) entity) or receive a signal from the base station or the network entity. In an embodiment, the transmitted or received signal may include a control signal and data.

According to an embodiment, the memory 220 may contain or store a program or data required for the operations of the terminal 200. For example, the memory 220 may be a non-transitory memory, and the program stored in the non-transitory memory may be intimately coupled with hardware configuration (e.g., the processor 230 or the transceiver 210) of the terminal 200. The memory 220 may store the control information or the data contained in the signal obtained by the terminal 200. In an embodiment, the memory 220 may include a read-only memory (ROM), a random access memory (RAM), a hard disk, a compact disk (CD)-ROM, a digital versatile disk (DVD), and/or a storage medium.

According to an embodiment, the processor 230 may include one processor or a plurality of processors. For example, the processor 230 may include a communication processor. For example, the processor 230 may include a communication processor and/or an application processor.

According to an embodiment, the processor 230 may control a series of processes carried out by the terminal 200. For example, the transceiver 210 may receive a data signal including control information transmitted by the base station or the network entity. The processor 230 may process the received control signal and data signal.

The term 'processor' in the disclosure may be replaced by various terms which execute or perform the operations of the terminal 200. For example, the processor may be replaced with a controller or a computing circuit.

The terminal 200 of the disclosure may correspond to the first terminal 120 and/or the second terminal 130 of FIG. 1.

Figure 3:
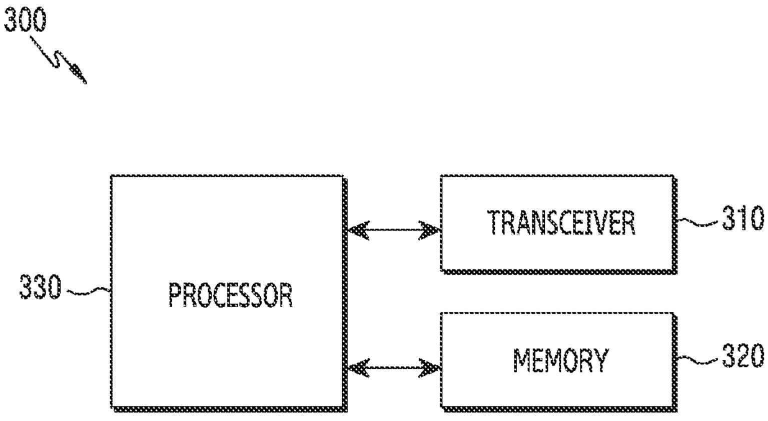
FIG. 3 illustrates a diagram of a structure of a base station according to an embodiment of the disclosure.

FIG. 3 illustrates a diagram of a structure of a base station according to an embodiment of the disclosure.

Referring to FIG. 3, a base station 300 may include a transceiver 310, a memory 320 and/or a processor 330 according to an embodiment. The disclosure describes that the base station 300 includes the transceiver 310, the memory 320 and/or the processor 330, but this is merely an example. For example, the base station 300 may further include other component than the transceiver 310, the memory 320 and the processor 330.

According to an embodiment, the transceiver 310, the memory 320 and the processor 330 each may be implemented or formed as a separate chip. However, this is merely an example and the transceiver 310, the memory 320 and/or the processor 330 may be implemented or formed as a single chip.

According to an embodiment, the transceiver 310 may include at least one transmitter and/or at least one receiver. For example, the transceiver 310 may include an RF transmitter for amplifying and up-converting a frequency of a transmitted signal. The transceiver 310 may include an RF receiver for down-converting a frequency of a received signal and low-noise-amplifying the signal.

The components of the transceiver 310 explained in the disclosure are merely exemplary, and the components of the transceiver 310 are not limited to the RF transmitter and the RF receiver. For example, the transceiver 310 may further include a coupler for obtaining isolation between the RF transmitter and the RF receiver.

According to an embodiment, the transceiver 310 may transmit or receive a signal to or from the processor 330. For example, the transceiver 310 may transmit or deliver an RF signal receiver over a wireless communication channel to the processor 330. The transceiver 310 may receive an RF signal from the processor 330.

According to an embodiment, the transceiver 310 may be referred to as a base station transmitter or a base station receiver.

According to an embodiment, the transceiver 310 may transmit a signal to the terminal 200 or receive a signal from the terminal 200. In an embodiment, the transmitted or received signal may include a control signal and data.

According to an embodiment, the memory 320 may contain or store a program or data required for the operations of the base station 300. For example, the memory 320 may be a non-transitory memory, and the program stored in the non-transitory memory may be intimately coupled with hardware configuration (e.g., the processor 330 or the transceiver 310) of the base station 300. The memory 320 may store the control information or the data contained in the signal obtained by the base station 300. In an embodiment, the memory 320 may include a ROM, a RAM, a hard disk, a CD-ROM, a DVD, and/or a storage medium.

According to an embodiment, the processor 330 may include one processor or a plurality of processors. For example, the processor 330 may include a communication processor. For example, the processor 330 may include a communication processor and/or an application processor.

According to an embodiment, the processor 330 may control a series of processes carried out by the base station 300. For example, the transceiver 310 may receive a data signal including control information transmitted by a base station or a network entity. The processor 330 may process the received control signal and data signal.

The term 'processor' in the disclosure may be replaced by various terms which execute or perform the operations of the base station 300. For example, the processor may be replaced with a controller or a computing unit.

Figure 4:
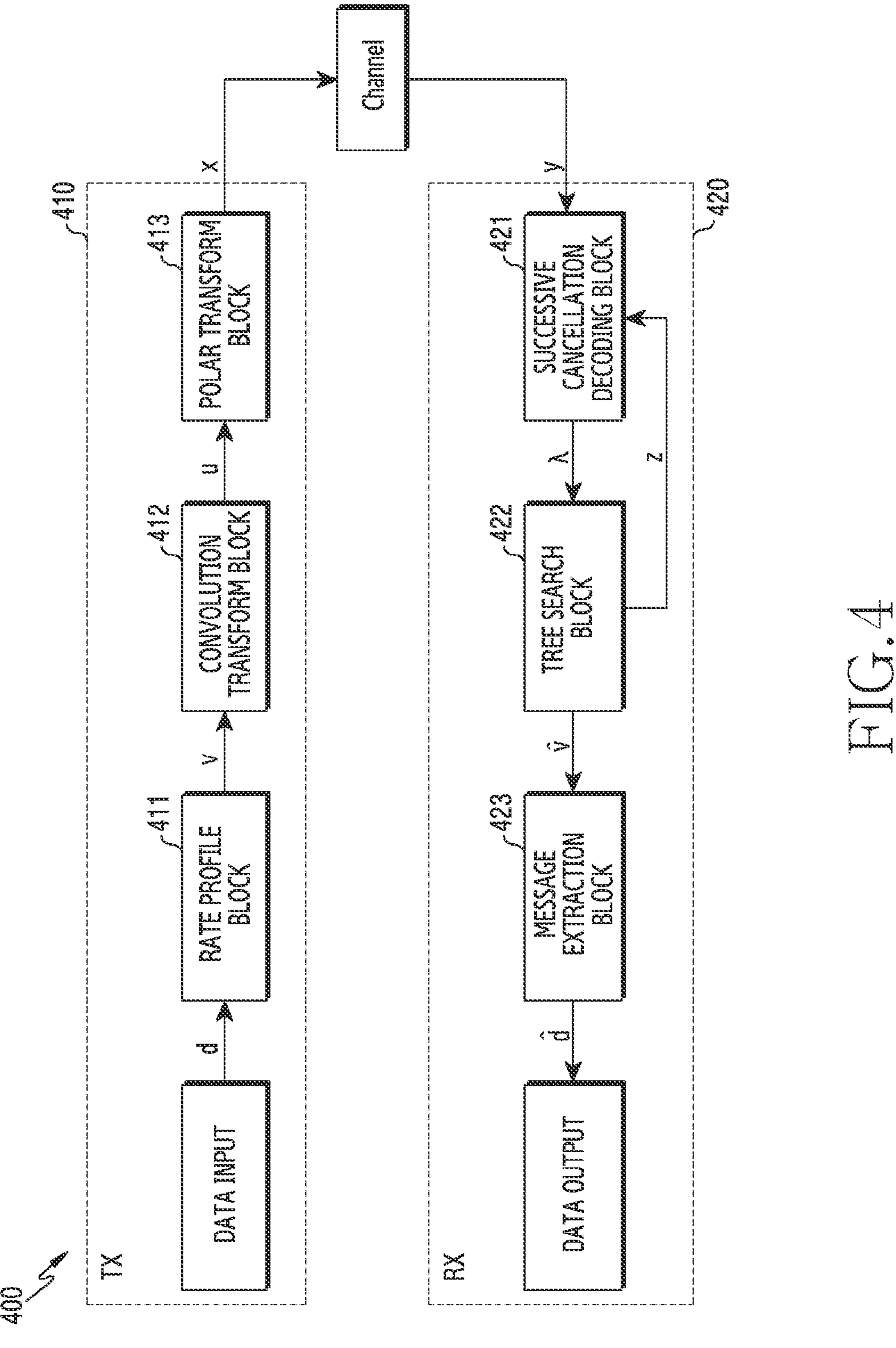
FIG. 4 illustrates a diagram of polarization-adjusted convolutional (PAC) coding according to an embodiment of the disclosure.

FIG. 4 illustrates a diagram of polarization-adjusted convolutional (PAC) coding according to an embodiment of the disclosure.

Referring to FIG. 4, a wireless communication network 400 according to an embodiment may include a transmitting node 410 and/or a receiving node 420.

According to an embodiment, the transmitting node 410 and the receiving node 420 may correspond to a terminal (e.g., the terminal 200 of FIG. 2) or a base station (e.g., the base station 300 of FIG. 3) respectively. For example, the transmitting node 410 may correspond to the base station 300, and the receiving node 420 may correspond to the terminal 200. The transmitting node 410 may transmit an RF signal to the receiving node 420 over a radio communication channel, and the receiving node 420 may receive an RF signal from the transmitting node 410 over the radio communication channel.

For example, the transmitting node 410 may correspond to a first terminal (e.g., the first terminal 120 of FIG. 1), and the receiving node 420 may correspond to a second terminal (e.g., the second terminal 130 of FIG. 1). The transmitting node 410 may perform sidelink communication by transmitting an RF signal to the receiving node 420.

According to an embodiment, the RF signal transmitted from the transmitting node 410 to the receiving node 420 may include encoded bits, and the encoded bits may be decoded at the receiving node 420. Hereafter, decoding the encoded bits using the PAC coding scheme shall be described.

According to an embodiment, the transmitting node 410 may include a rate profile block 411, a convolution transform block 412 and/or a polar transform block 413.

According to an embodiment, data may be inputted to the rate profile block 411. For example, a data vector d may be inputted to the rate profile block 411, and the data vector may be referred to as a designated number of bits. For example, the data vector may be referred to as $d=\{d_0, d_1, \ldots, d_{A-1}\}$. The number of the bits of the data vector may be A.

According to an embodiment, the rate profile block 411 may perform rate profiling on the inputted data vector d. For example, the rate profile block 411 may transform the data vector d into a rate-profiled vector v including information bits containing information to transmit and frozen bits without information in a designated rule (or, order) based on (or, using) a preset sequence.

According to an embodiment, the rate profiled vector including the inserted frozen bits may be referred to as $v=\{v_0, v_1, \ldots v_{N-1}\}$. The number of the bits of the rate profiled vector may be N, and the number of the inserted frozen bits may be N-A. In an embodiment, the number of at least one frozen bit inserted or concatenated may be preset. For example, the number of at least one frozen bit inserted or concatenated may correspond to the information bits included in the data vector d or a type of the information bits. According to an embodiment, as the rate profile block 411 inserts the frozen bits into the data vector v, even if some of the bits included in the RF signal transmitted from the transmitting node 410 are lost due to the wireless communication channel, the loss of the data bits contained in the RF signal may be minimized or reduced.

According to an embodiment, the rate profile block 411 may output the rate profiled vector v to the convolution transform block 412.

According to an embodiment, the rate profiled vector v may be received or delivered from the rate profile block 411 to the convolution transform block 412. The convolution transform block 412 may obtain a convolution transform (CT) vector using [Equation 1].

$$u = vG \qquad \text{[Equation 1]}$$

In [Equation 1], u is the CT vector, and v is the rate profiled vector. G is a conventional generator polynomial and may be obtained or acquired from a conventional generator polynomial $g=[g_0, g_1, \ldots, g_{m-1}]$.

According to an embodiment, the convolution transform block 412 may output the obtained CT vector u to the polar transform block 413.

According to an embodiment, the polar transform block 413 may receive the CT vector u from the convolution transform block 412. The polar transform block 413 may convert the received CT vector u into a codeword (or, a codeword vector) x. For example, the polar transform block 413 may transform the CT vector u into the codeword x using [Equation 2]. For example, the polar transform block 413 may obtain the codeword (or, a codeword vector) x based on the CT vector u.

$$x = uP_n \qquad \text{[Equation 2]}$$

In [Equation 2], x is the codeword, u is the CT vector, and $P_n$ is a designated polar code generator matrix. For example, the polar code generator matrix may be acquired using $P_n = p^{\otimes n}$, in case that an Arikan kernel is $$P = \begin{bmatrix} 1 & 0 \\ 1 & 1 \end{bmatrix}.$$

In an embodiment, $p^{\otimes n}$ may be referred to as an n-th Kronecker product of the matrix P.

According to an embodiment, the polar transform block 413 may output the obtained codeword (or, the codeword vector) x, and transmit the outputted codeword (or, the codeword vector) x to the receiving node 420.

According to an embodiment, the polar-transformed codeword x may be transmitted to the receiving node 420 over the wireless communication channel. For example, the codeword may be referred to as a message including the data bits or information including the data bits.

According to an embodiment, the receiving node 420 may include a successive cancellation decoding block 421, a tree search block 422 and/or a message extraction block 423.

According to an embodiment, the receiving node 420 may receive a codeword (or, a codeword vector) y passing through the wireless communication channel from the transmitting node 410. The codeword y received over the wireless communication channel may be different from the codeword x. For example, the codeword x transmitted from the transmitting node 410 may be affected by a channel environment during the transmission to the receiving node 420 over the wireless communication channel, and the codeword y received at the receiving node 420 may differ from the codeword x transmitted by the transmitting node 410. For example, the channel environment may vary depending on a location change of the transmitting node 410 or the receiving node 420.

According to an embodiment, the codeword y received at the receiving node 420 may be inputted to the successive cancellation decoding block 421 of the receiving node 420. The successive cancellation decoding block 421 may calculate a reliability value of each of the bits required to decode the inputted codeword y in the tree search manner and thus deliver or transmit the reliability value to the tree search block 422. For example, the reliability value of each of the bits delivered to the tree search block 422 may be used for Fano decoding. In an embodiment, the successive cancellation decoding block 421 may operate as a polar code decoder.

According to an embodiment, the tree search block 422 may perform the decoding using the search tree scheme with a reliability value $\lambda$ of a specific bit received. The tree search block 422 may deliver decoded bits $\hat{u}$ to the successive cancellation decoding block 421.

According to an embodiment, the successive cancellation decoding block 421 and the tree search block 422 may repeat the above operations until the decoding is completed, and decode the received codeword y. In case that the decoding is finished based on a specific criterion, the tree search block 422 may output a vector $\hat{v}$ including the decoded bits to the message extraction block 423.

According to an embodiment, the message extraction block 423 may receive the vector $\hat{v}$ including the decoded bits from the tree search block 422. The message extraction block 423 may extract a message from the vector $\hat{v}$ including the decoded bits.

According to an embodiment, the message extraction block 423 may extract a data vector $\hat{d}$ estimated from the vector $\hat{v}$ including the decoded bits. The message extraction block 423 may deliver the estimated data vector $\hat{d}$ to the processor or the controller of the receiving node 420.

It may be understood that the blocks of the transmitting node 410 of the disclosure are performed substantially by at least one processor or controller of the transmitting node 410. For example, it may be understood that the function of the rate profile block 411 of the transmitting node 410 is performed substantially by at least one processor or controller of the transmitting node 410.

It may be understood that the blocks of the receiving node 420 of the disclosure are performed substantially by at least one processor or controller of the receiving node 420. For example, it may be understood that the function of the successive cancellation decoding block 421 of the receiving node 420 is performed substantially by at least one processor or controller of the receiving node 420.

The term 'the transmitting node' in the disclosure may be replaced by the term such as a transmitting device, a first device or a first electronic device. The term 'the receiving node' may be replaced by the term such as a receiving device, a second device or a second electronic device.

The disclosure divides the transmitting node which transmits the signal (e.g., a codeword) and the receiving node which receives the signal (e.g., a codeword) based on the relationship between the transmitting node and the receiving node, but this is merely an example. The transmitting node may also perform the signal reception as well as the signal transmission. Likewise, the receiving node may perform the signal transmission as well as the signal reception.

It may be understood that the block of the disclosure indicates a layer or a module which performs a designated function. Hence, the term 'block' in the disclosure may be replaced by the layer or the module. For example, the rate profile block 411 may be referred to as a rate profile layer or a rate profile module. For example, the successive cancellation decoding block 421 may be referred to as a successive cancellation layer or a successive cancellation module.

Decoding according to the PAC Fano decoding scheme (e.g., a second scheme) described in FIG. 5 through FIG. 13 may be carried out substantially by the blocks in the receiving node 420 described in FIG. 4 of the disclosure. For example, the blocks in the receiving node 420 may correspond to blocks for performing the PAC Fano decoding.

Figure 5:
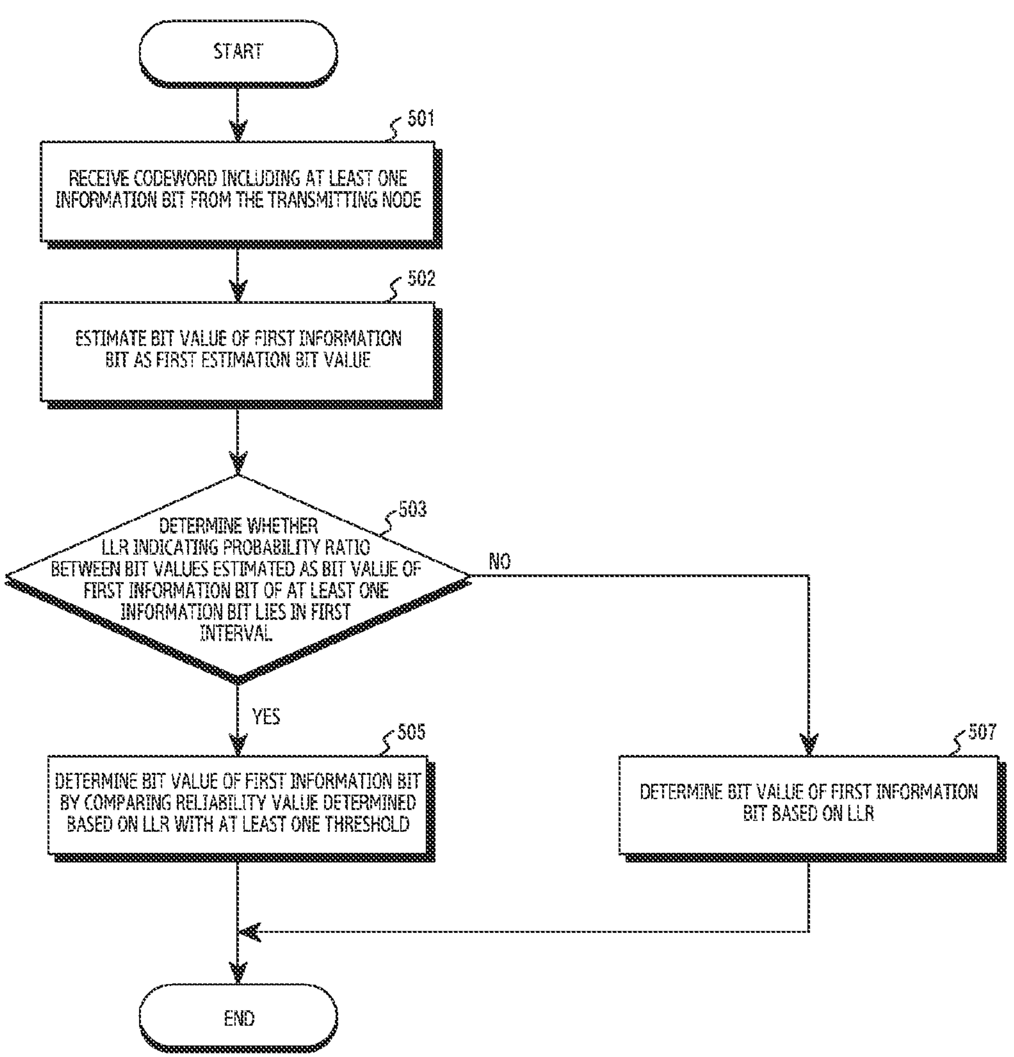
FIG. 5 illustrates a diagram of a method for determining a bit value of an information bit based on a log-likelihood ratio (LLR) according to an embodiment of the disclosure.

FIG. 5 illustrates a diagram of a method for determining a bit value of an information bit based on an LLR according to an embodiment of the disclosure.

Referring to FIG. 5, the receiving node 420 according to an embodiment may receive a codeword including at least one information bit from the transmitting node 410 in operation 501. For example, the transmitting node 410 may transmit the codeword to the receiving node 420, and the transmitted codeword may include at least one information bit, at least one frozen bit and/or at least one parity bit (e.g., a cyclic redundancy check (CRC) bit).

According to an embodiment, the receiving node 420 may estimate a bit value of a first information bit as a first estimation bit value in operation 502. For example, the receiving node 420 may estimate the bit value of the first information bit as the first estimation bit value (e.g., 0).

The disclosure illustrates the first estimation bit value as 0 for ease of explanation, but this is only an example. For example, the first estimation bit value may be 1.

According to an embodiment, the receiving node 420 may determine whether the LLR indicating a probability ratio between bit values (e.g., 0 or 1) which can be estimated as the bit value of the first information bit of the at least one information bit, is included in a first interval, in operation 503.

For example, the LLR may be referred to as the ratio of the probability that the bit value of the information bit is 0 to the probability that the bit value of the information bit is 1. In other words, the LLR may be referred to as the ratio of the probability that the bit value of the information bit is 0 to the probability that the bit value of the information bit is 1.

For example, LLR(i) which is the LLR of an i-th information bit may be obtained based on [Equation 3].

$$LLR(i) = \frac{\log(P(v_i = 0|y_i))}{P(v_i = 1|y_i)} \quad \text{[Equation 3]}$$

According to an embodiment, the first interval may be referred to as a range for the LLR. For example, the first interval may include an interval of the LLR between a first set value (e.g., ε) and a second set value (e.g., −ε) having a value opposite to the first set value. For example, the first interval may include a first range of the LLR from 0 to the first set value (e.g., ε) and a second range of the LLR from 0 to the second set value (e.g., −ε). For example, the first interval may include an interval where the LLR ranges from the first set value (e.g., ε) to the second set value (e.g., −ε) which is identical in the absolute value but opposite in sign to the first set value.

According to an embodiment, the first interval may be an interval between a second interval and a third interval. For example, the second interval may include an interval where the LLR is greater than the first set value (e.g., ε). The third interval may include an interval where the LLR is smaller than the second set value (e.g., −ε).

According to an embodiment, the first set value and/or the second set value for dividing the first interval, the second interval and/or the third interval may be determined based on various schemes.

For example, the first set value and/or the second set value may be determined based on at least one of a signal to noise ratio (SNR), a modulation order or a code rate indicating a ratio of at least one information bit in the codeword. For example, the SNR may be referred to as an SNR indicating a channel quality between the transmitting node 410 and the receiving node 420.

For example, the first set value and/or the second set value may be determined based on a stored look-up table. In other words, the receiving node 420 may identify the SNR indicating the channel quality between the transmitting node 410 and the receiving node 420, and the receiving node 420 may determine the first set value and/or the second set value of the first interval corresponding to the identified SNR based on the stored look-up table.

According to an embodiment, in case that the LLR is included in the first interval, the receiving node 420 may determine the bit value of the first information bit by comparing the reliability value determined based on the LLR with at least one threshold in operation 505. For example, the reliability value determined based on the LLR may be a sum of the LLR values of the information bits. For example, a reliability value corresponding to a first-order information bit may be a first LLR which is the LLR of the first-order information bit. A reliability value corresponding to a second-order information bit may be the sum of a first LLR and a second LLR, wherein the second LLR may be the LLR of the second-order information bit. Similarly, a reliability value corresponding to a third-order information bit may be the sum of the first LLR, the second LLR, and a third LLR, wherein the third LLR may be the LLR of the third-order information bit. As another example, the reliability value may be a path metric (PM) value.

According to an embodiment, the receiving node 420 may determine the bit value of the first information bit as a first estimation bit value (e.g., 0) or a second estimation bit value (e.g., 1) by comparing the reliability value (e.g., the PM value) without LLR separation and the at least one threshold.

For example, the receiving node 420 may determine the bit value of the first information bit as the first estimation bit value (e.g., 0) in case that the reliability value determined based on the LLR included in the first interval is greater than or equal to a first threshold.

For example, in case that the reliability value determined based on the LLRs included in the first interval falls below the first threshold, the receiving node 420 may compare the reliability value with a first adjusted threshold. In case that the reliability value falls below the first adjusted threshold, the receiving node 420 may determine the bit value of the first information bit as the second estimation bit value (e.g., 1). In an example, the first adjusted threshold may be greater than the first threshold.

Figure 6:
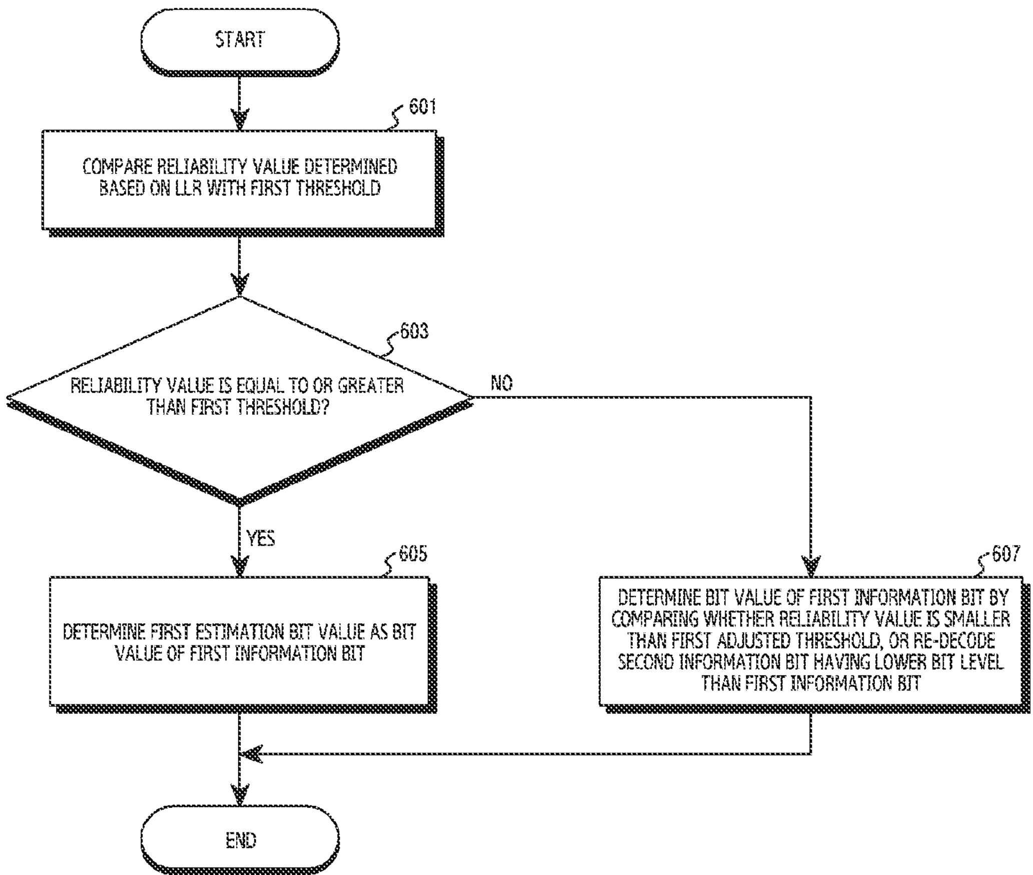
FIG. 6 illustrates a diagram of a method for determining a bit value of a first information bit by comparing a reliability value determined based on an LLR with the at least one threshold according to an embodiment of the disclosure.

Determining the first information bit value by comparing the at least one threshold with the reliability value determined based on the LLR as described in operation 505 of FIG. 5 in the disclosure shall be elucidated in FIG. 6.

According to an embodiment, the receiving node 420 may not separate the LLR into separation reliability values for the bit values (e.g., 0, 1) of the first information bit respectively by using the reliability value and the at least one threshold. As a result, the receiving node 420 may reduce or minimize time and/or computational resources required for the decoding, by omitting obtaining the separation reliability values based on the LLR.

For example, in case that the receiving node 420 separates the LLR into the separation reliability values without directly utilizing the LLR, the receiving node 420 may need to obtain a first separation reliability value for the first estimation bit value (e.g., 0) and/or a second separation reliability value for the second estimation bit value (e.g., 1) based on the LLR of the first information bit.

For example, P0 which is the first separation reliability value for the first estimation bit value (e.g., 0) may be obtained based on [Equation 4].

$$P0 = \frac{1}{2}(1 - \sin(LLR))|LLR| - \log(1 + \exp(-|LLR|)) \quad \text{[Equation 4]}$$

In an example, the receiving node 420 may estimate the bit value of the first information bit as the first estimation bit value (e.g., 0) in operation 502, and the receiving node 420 may determine the bit value of the first information bit as the first estimation bit value (e.g., 0) in case that P0 which is the first separation reliability value of the first estimation bit value (e.g., 0) is greater than the first threshold.

In another example, the receiving node 420 may obtain the second separation reliability value of the second estimation bit value (e.g., 1) by using the LLR and P0. For example, P1 which is the second separation reliability value of the second estimation bit value (e.g., 1) may be obtained based on [Equation 5].

$$P1 = -LLR + P0 \quad \text{[Equation 5]}$$

In an example, the receiving node 420 may estimate the first information bit as the second estimation bit value (e.g., 1) in operation 502. In case that P1 which is the second separation reliability value for the second estimation bit value (e.g., 1) is greater than the second threshold, the receiving node 420 may determine the bit value of the first information bit as the second estimation bit value (e.g., 1).

In conclusion, in case that the receiving node 420 determines the first information bit using the first separation reliability value P0 and the second separation reliability value P0 without directly using the LLR, the receiving node 420 may need to calculate the separation reliability values for each reliability test using Equation 4 and Equation 5.

There may be various search paths due to the characteristics of the PAC Fano decoding which performs the decoding using the search tree scheme. Hence, the time taken for decoding may be delayed, in case that the receiving node 420 obtains the separate reliability values every time the receiving node 420 decodes the information bits through various search paths.

By contrast, in case that the receiving node 420 according to an embodiment determines the bit value of the first information bit by comparing the reliability value based on the LLR and the threshold without the LLR separation as described in operation 505, the time taken for decoding may be reduced or minimized.

According to an embodiment, in case that the LLR is not included in the first interval, the receiving node 420 may determine the bit value of the first information bit based on the LLR in operation 507. For example, in case that the LLR is included in the second interval (e.g., a second interval 902 of FIG. 9), the receiving node 420 may determine the bit value of the first information bit as the first estimation bit value (e.g., 0). In another example, in case that the LLR is included in the third interval (e.g., a third interval 903 of FIG. 9), the receiving node 420 may determine the bit value of the first information bit as the second estimation bit value (e.g., 1).

According to an embodiment, the bit value of the first information bit determined in operation 507 and the estimation bit value estimated in operation 502 may be different.

For example, the receiving node 420 may estimate the bit value of the first information bit as the second estimation bit value (e.g., 1) in operation 502. In case that the LLR is included in the second interval, the receiving node 420 may determine the bit value of the first information bit as the first bit value (e.g., 0). That is, even though the receiving node 420 estimated the bit value of the first information bit as the second estimation bit value (e.g., 1), in case that the LLR is included in the second interval, the receiving node 420 may determine the bit value of the first information bit as the first bit value (e.g., 0).

In another example, the receiving node 420 may estimate the bit value of the first information bit as the first estimation bit value (e.g., 0) in operation 502. In case that the LLR is included in the third interval, the receiving node 420 may determine the bit value of the first information bit as the second estimation bit value (e.g., 1). That is, even though the receiving node 420 estimated the bit value of the first information bit as the first bit value (e.g., 0), in case that the LLR is included in the third interval, the receiving node 420 may determine the bit value of the first information bit as the second bit value (e.g., 1).

According to an embodiment, the second interval may be referred to as an interval corresponding to the first bit value (e.g., 0) or the first estimation bit value (e.g., 0). The third interval may be referred to as an interval corresponding to the second bit value (e.g., 1) or the second estimation bit value (e.g., 1). For example, the second interval may be referred to as an interval for determining the bit value of the information bit as the first bit value (e.g., 0) in case that the LLR is included in the second interval. The third interval may be referred to as an interval for determining the bit value of the information bit as the second bit value (e.g., 1) in case that the LLR is included in the third interval.

In the disclosure, the LLR and the reliability value (or, the PM value) based on the LLR each may be a value mapped to the first information bit, and the first separation reliability value and the second separation reliability value obtained based on [Equation 4] and [Equation 5] may be values mapped to the bit values of the first information bit, respectively.

In operation 503 of the disclosure, the operation of the receiving node 420 for determining whether the LLR is included in the first interval may be substantially a first reliability test (or, a 1-stage reliability test). In operation 505 of the disclosure, the operation of the receiving node 420 for determining the bit value of the first information bit by comparing the reliability value with the at least one threshold may be substantially a second reliability test (or, a 2-stage reliability test).

[Table 1] may be referred to as a table for comparing the first reliability test and the second reliability test.

TABLE 1

| | first reliability test | second reliability test |
|---|---|---|
| Object | LLR | LLR (e.g., path matric) |
| Order | Performed in operations 503 and 507 | Performed in operation 505 |
| whether to update setting values or thresholds | The first setting value and/or the second setting value dividing the sections are not changed. | The threshold of the second reliability test (e.g., first threshold, first adjusted threshold) is changed. |

The disclosure describes that the first set value and the second set value are opposite values, but this is by way of example. For example, the second set value may differ from the first set value only in sign and not in absolute value.

In the disclosure, the operations of the receiving node 420 may be referred to as operations of the controller substantially included in the receiving node 420. The controller of the receiving node 420 in the disclosure may be replaced by the term for processing or computing data. For example, the controller may be replaced by at least one processor, a control unit, or a computing device.

FIG. 6 illustrates a diagram of a method for determining a bit value of a first information bit by comparing a reliability value determined based on an LLR with at least one threshold according to an embodiment of the disclosure.

Referring to FIG. 6, according to an embodiment, the receiving node 420 may compare the reliability value determined based on the LLR with the first threshold in operation 601. For example, the LLR may be the LLR corresponding to the first information bit.

Unlike the first separation reliability P0 and the second separation reliability P1 described in FIG. 5, the reliability value determined based on the LLR described in the disclosure may be obtained without separating the LLR.

According to an embodiment, the receiving node 420 may determine whether the LLR is equal to or greater than the first threshold in operation 603. The disclosure describes operation 601 and operation 603 separately, but this is by way of example only. Comparing the reliability value determined based on the LLR with the first threshold and determining whether the reliability value is equal to or greater than the first threshold may be substantially combined into a single operation.

According to an embodiment, in case that the reliability value is equal to or greater than the first threshold, the receiving node 420 may determine a first estimation bit value (e.g., 0) of the first information bit as the bit value of the first information bit in operation 605.

According to an embodiment, in case that the reliability value is smaller than the first threshold, the receiving node 420 may determine the bit value of the first information bit by comparing whether the reliability value is smaller than a first adjusted threshold, or re-decode the second information bit having the lower bit level than the first information bit in operation 607. For example, in case that the reliability value is smaller than the first threshold, the receiving node 420 may change the estimation bit value to a second estimation bit value (e.g., 1), and in case that the reliability value is equal to or smaller than the first adjusted threshold, the receiving node 420 may determine the bit value of the first information bit as the second estimation bit value (e.g., 1).

For example, in case that the reliability value is greater than the first adjusted threshold, the receiving node 420 may go backward to an information bit arranged before the first information bit. For example, in case that the reliability value is greater than the first adjusted threshold, the receiving node 420 may go backward to the information bit having the lower bit level than the first information bit.

In an example, in case that the reliability value is greater than the first adjusted threshold, the receiving node 420 may return to a root node (e.g., a third node 1003 of FIG. 10) of a search tree (e.g., a search tree 1000 of FIG. 10) for decoding the first information bit.

According to an embodiment, the first adjusted threshold may be different from the first threshold. For example, the first adjusted threshold may be higher than the first threshold.

The disclosure describes that the first adjusted threshold is higher than the first threshold, but this is merely an example. For example, assuming that the first estimation bit value is 0 and the second estimation bit value is 1, the disclosure explains that the first adjusted threshold is higher than the first threshold. As another example, assuming that the first estimation bit value is 1 and the second estimation bit value is 0, the first adjusted threshold may be lower than the first threshold.

Likewise, it has been described that, assuming that the first estimation bit value is 0, the bit value of the first information bit is determined as the first estimation bit value in case that the reliability value is equal to or greater than the first threshold in operation 603 and operation 605, but this is only an example. For example, assuming the first estimation bit value estimated in operation 502 is 1, the receiving node 420 may determine the bit value of the first information bit as 1 in case that the reliability value is below the first threshold in operation 603 and operation 605.

Likewise, it has been described that, assuming that the first estimation bit value is 1, in case that the reliability value is below the first adjusted threshold, the bit value of the first information bit is determined as the second estimation bit value in operation 607, but this is only an example. For example, assuming the first estimation bit value estimated in operation 502 is 1, in case that the reliability value is equal to or greater than the first threshold, the receiving node 420 may determine the bit value of the first information bit as 0 in operation 607.

According to an embodiment, in case that the LLR does not have high reliability to determine the bit value of the first information bit, the receiving node 420 may perform operation 601 through operation 607 to thus determine the bit value of the first information bit by comparing the reliability value with at least one threshold (e.g., the first threshold and/or the first adjusted threshold). For example, the LLR not having high reliability to determine the bit value of the first information bit may correspond to a case where the LLR is included in the first interval.

FIG. 6 of the disclosure has been described on the assumption that the first estimation bit value is 0 and the second estimation bit value is 1 by way of example, but this is only exemplary. For example, the description of FIG. 6 may be also applied in case that the first estimation bit value is 1 and the second estimation bit value is 0.

Operation 601 through operation 607 described in FIG. 6 of the disclosure may correspond to operation 505 of FIG. 5. For example, operation 505 of FIG. 5 in which the receiving node determines the bit value of the first information bit by comparing the reliability value with the at least one threshold may include operation 601 through operation 607 of FIG. 6. Hence, the embodiment of FIG. 6 may be combined with the embodiment of FIG. 5.

Figure 7:
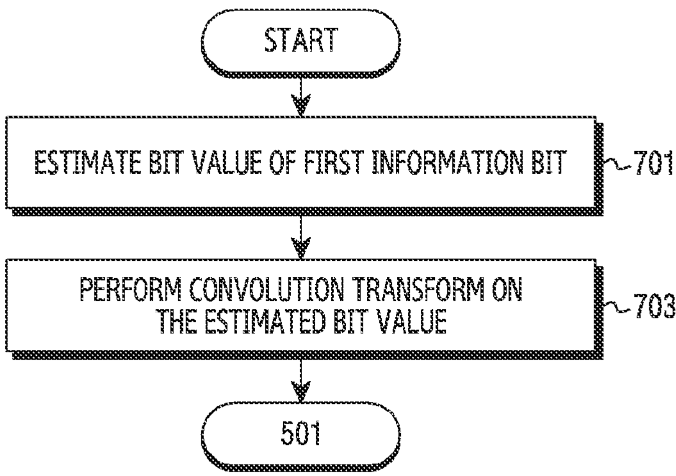
FIG. 7 illustrates a diagram of a method for estimating a bit value of a first information bit and performing convolution transform on the estimated bit value according to an embodiment of the disclosure.

FIG. 7 illustrates a diagram of a method for estimating a bit value of a first information bit and performing convolution transform on the estimated bit value according to an embodiment of the disclosure.

Referring to FIG. 7, the receiving node 420 according to an embodiment may estimate the bit value of the first information bit in operation 701. For example, the receiving node 420 may identify at least one information bit included in a codeword received from the transmitting node 410, and estimate the bit value of the first information bit to decode the first information bit of the at least one information bit. For example, the receiving node 420 may estimate the bit value of the first information bit as a first estimation bit value (e.g., 0) or a second estimation bit value (e.g., 1).

For example, operation 701 of FIG. 7 may correspond to operation 502 of FIG. 5.

According to an embodiment, the estimation bit value of the first estimated information bit may be identical to or different from the bit value determined with the bit value of the first information bit. For example, the receiving node 420 may estimate the bit value of the first information bit as the first estimation bit value (e.g., 0) in operation 701, and the receiving node 420 may determine the bit value of the first information bit as the first bit value (e.g., 0) in operation 505 or operation 507 of FIG. 5. That is, the estimation bit value and the determined bit value may be substantially identical.

For example, the receiving node 420 may estimate the bit value of the first information bit as the first estimation bit value (e.g., 0) in operation 701, and the receiving node 420 may determine the bit value of the first information bit as the second bit value (e.g., 1) in operation 505 or operation 507 of FIG. 5. That is, the estimation bit value and the determined bit value may be different.

According to an embodiment, the receiving node 420 may perform the convolution transform on the estimated bit value (or, the estimation bit value) in operation 703.

The disclosure describes that the bit value estimated by the receiving node 420 in operation 701 is the estimation bit value and the bit value determined by the receiving node 420 in operation 505 or operation 507 is the determined bit value, but this is by way of example only. For example, for the sake of distinction or for ease of description, the bit value estimated by the receiving node 420 in operation 701 may be referred to as an estimated bit value or a candidate bit value. For example, the bit value determined in operation 505 or operation 507 may be referred to as a final bit value.

Figure 8:
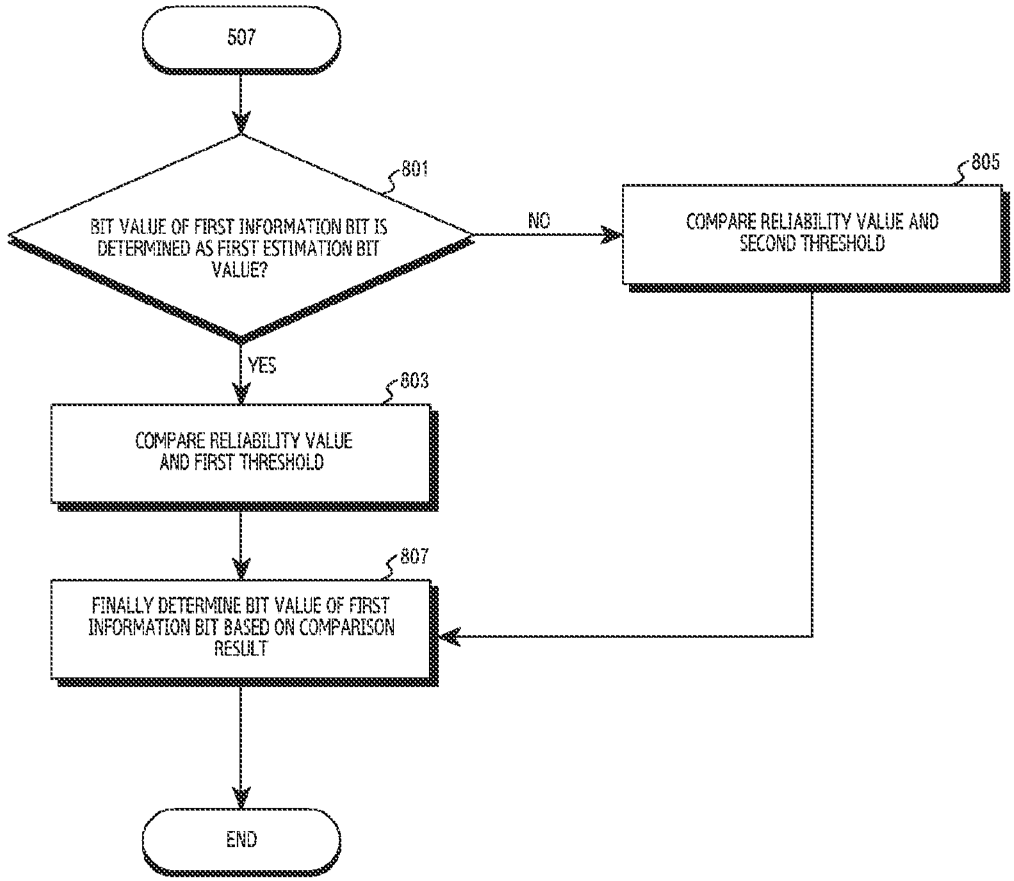
FIG. 8 illustrates a diagram of a method for determining a final bit value with respect to a determined bit value using a reliability value determined based on an LLR and a first threshold or a second threshold according to an embodiment of the disclosure.

FIG. 8 illustrates a diagram of a method for determining a final bit value using a reliability value determined based on an LLR and a first threshold or a second threshold with respect to a determined bit value according to an embodiment of the disclosure.

Referring to FIG. 8, the receiving node 420 according to an embodiment may determine whether the bit value of the first information bit is determined as the first estimation bit value (e.g., 0), in operation 801. For example, the receiving node 420 may determine the bit value of the first information bit in operation 507, and the determined bit value of the first information bit may be the first estimation bit value (e.g., 0) or the second estimation bit value (e.g., 1).

According to an embodiment, in case that the bit value of the first information bit is determined as the first estimation bit value (e.g., 0), the receiving node 420 may compare the reliability value determined based on the LLR with the first threshold in operation 803. For example, the LLR and the reliability value may be values corresponding to the first information bit.

According to an embodiment, in case that the bit value of the first information bit is determined as the second estimation bit value (e.g., 1), the receiving node 420 may compare the reliability value and the second threshold in operation 805. For example, the second threshold may be different from the first threshold. For example, the second threshold may be a threshold for the second estimation bit value (e.g., 1), and the first threshold may be a threshold for the first estimation bit value (e.g., 0).

According to an embodiment, the receiving node 420 may finally determine the bit value of the first information bit based on the comparison result in operation 807. For example, the receiving node 420 may finally determine the bit value of the first information bit based on the result of comparing the reliability value and the first threshold. For example, the receiving node 420 may finally determine the bit value of the first information bit based on the result of comparing the reliability value and the second threshold.

According to an embodiment, in case that the reliability value is greater than or equal to the first threshold, the receiving node 420 may finally determine the bit value of the first information bit as the first estimation bit value (e.g., 0). In another example, in case that the reliability value is smaller than the first threshold, the receiving node 420 may change (or flip) the estimation bit value from the first estimation bit value (e.g., 0) to the second estimation bit value (e.g., 1). The receiving node 420 may compare the reliability value and the first adjusted threshold and finally determine the bit value of the first information bit as the second estimation bit value (e.g., 1) in case that the reliability value is smaller than or equal to the first adjusted threshold. More detailed description on the bit flip shall be explained in FIG. 11B.

According to an embodiment, in case that the reliability value is below the second threshold, the receiving node 420 may finally determine the bit value of the first information bit as the second estimation bit value (e.g., 1). As another example, in case that the reliability value is greater than the second threshold, the receiving node 420 may change (or flip) the estimation bit value from the second estimation bit value (e.g., 1) to the first estimation bit value (e.g., 0). The receiving node 420 may compare the reliability value and the second adjusted threshold and finally determine the bit value of the first information bit as the first estimation bit value (e.g., 0) in case that the reliability value is greater than the second adjusted threshold.

According to an embodiment, even though the receiving node 420 determines the bit value of the first information bit as 0 or 1 using the LLR in operation 507, the receiving node 420 may increase the reliability of the final determined bit value by comparing the reliability value and the thresholds in operation 801 through operation 807.

That is, the receiving node 420 may increase the reliability of the finally confirmed bit value by conducting the first reliability test (or, the first-stage reliability test) in operation 507 and the second reliability test (or, the second-stage reliability test) in operation 801 through operation 807.

Figure 9:
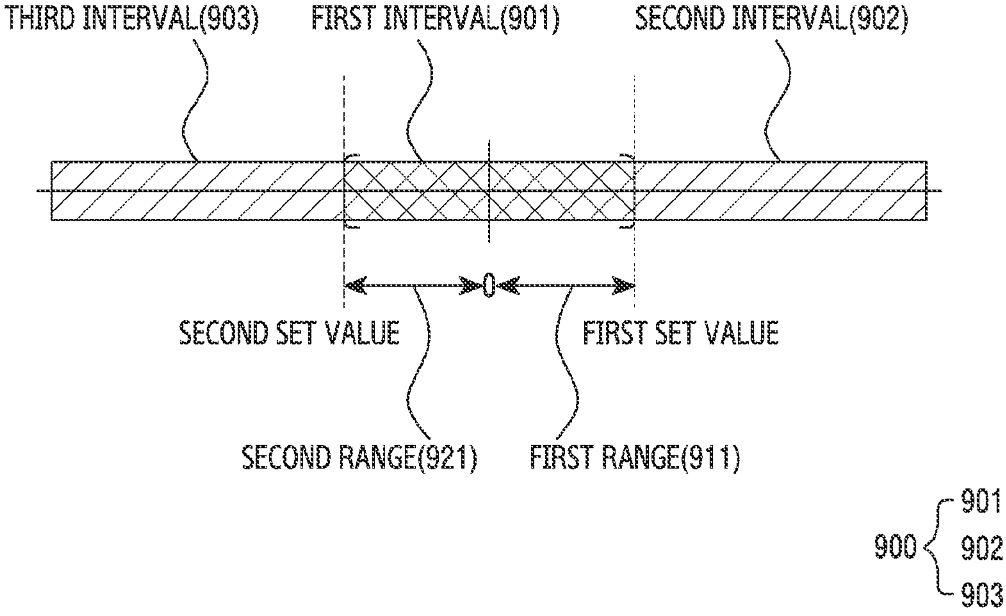
FIG. 9 illustrates a diagram of a first interval, a second interval and a third interval according to an embodiment of the disclosure.

FIG. 9 illustrates a diagram of a first interval, a second interval, and a third interval according to an embodiment of the disclosure.

Referring to FIG. 9, an interval 900 for the LLR according to an embodiment may include a first interval 901, a second interval 902 and/or a third interval 903.

For example, the first interval 901 may include an interval or a range where the LLR is from the first set value (e.g., ε) to the second set value (e.g., −ε). For example, the second interval 902 may include an interval or a range where the LLR is above the first set value (e.g., ε). For example, the third interval 903 may include an interval or a range where the LLR is below the second set value (e.g., ε).

According to an embodiment, the first interval 901 may include a first range 911 from the first set value to 0 and/or a second range 912 from the second set value to 0.

According to an embodiment, the first interval 901 may be referred to as a suspension interval. For example, in case that the LLR of the first information bit is included in the first interval 901, the receiving node 420 the receiving node 420 may determine the bit value of the first information bit by comparing the reliability value with the at least one threshold since the reliability may be relatively low for the receiving node 420 to determine the bit value of the first information bit based on the LLR.

According to an embodiment, the second interval 902 may be referred to as an interval corresponding to the first estimation bit value (e.g., 0). For example, in case that the LLR of the first information bit is included in the second interval 902, the receiving node 420 may determine the bit value of the first information bit as the first estimation bit value (e.g., 0).

According to an embodiment, the third interval 903 may be referred to as an interval corresponding to the second estimation bit value (e.g., 1). For example, in case that the LLR of the first information bit is included in the third interval 903, the receiving node 420 may determine the bit value of the first information bit as the second estimation bit value (e.g., 1).

The disclosure has described that, in case that the LLR of the first information bit is included in the first interval 901, the receiving node 420 determines the bit value of the first information bit using the reliability value determined based on the LLR, but this is merely an example. For example, the receiving node 420 may determine the bit value of the first information bit using only the LLR, even if the LLR of the first information bit is included in the first interval 901. For example, in case that the LLR of the first information bit is included in the first range 911 of the first interval 901, the receiving node 420 may determine the LLR of the first information bit as the first estimation bit value (e.g., 0). For example, in case that the LLR of the first information bit is included in the second range 912 of the first interval 901, the receiving node 420 may determine the LLR of the first information bit as the second estimation bit value (e.g., 1).

Figure 10:
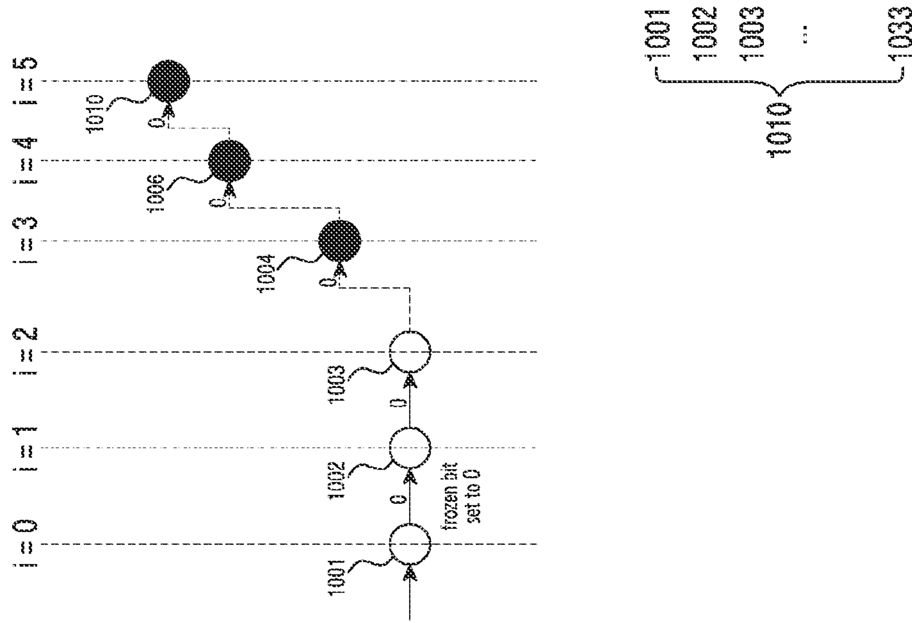
FIG. 10 illustrates a diagram of a decoding method according to a search tree scheme according to an embodiment of the disclosure.
Figure 10:
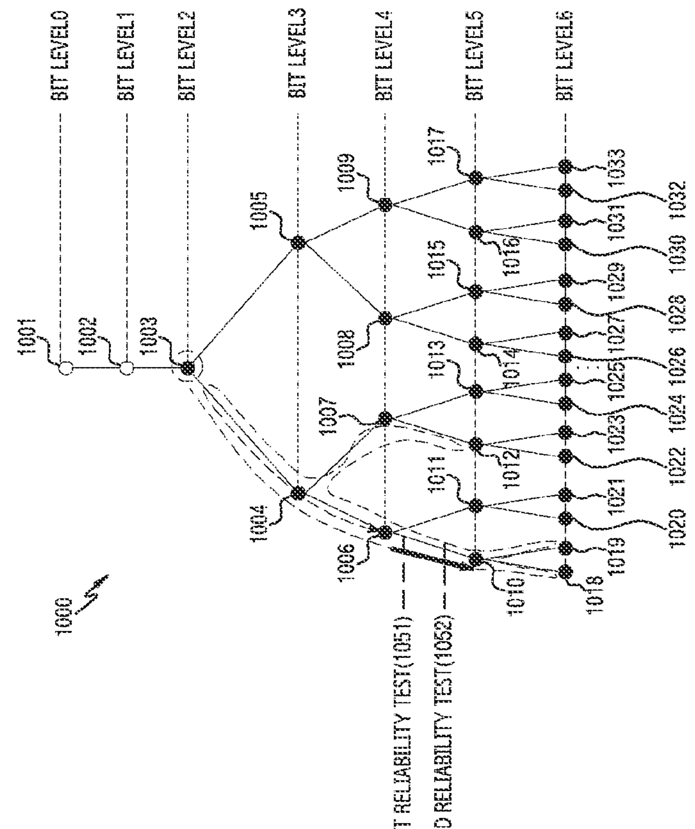

FIG. 10 illustrates a diagram of a decoding method according to a search tree scheme according to an embodiment of the disclosure.

Referring to FIG. 10, a search tree 1000 for decoding a codeword including at least six bits is depicted according to an embodiment. The search tree 1000 may be configured with a plurality of nodes. In another example, the search tree 1000 may include a plurality of nodes.

According to an embodiment, the search tree 1000 may include nodes of various bit levels. For example, the search tree 1000 may include a first node 1001 with the bit level of 0. The search tree 1000 may include a second node 1002 with the bit level of 1. The search tree 1000 may include a third node 1003 with the bit level of 2. The search tree 1000 may include a fourth node 1004 and a fifth node 1005 with the bit level of 3. The search tree 1000 may include a sixth node 1006, a seventh node 1007, an eighth node 1008 and a ninth node 1009 with the bit level of 4. The search tree 1000 may include a tenth node 1010, an 11th node 1011, a 12th node 1012, a 13th node 1013, a 14th node 1014, a 15th node 1015, a 16th node 1016 and a 17th node 1017 with the bit level of 5. The search tree 1000 may include an 18th node 1018, a 19th node 1019, a 20th node 1020, a 21st node 1021, a 22nd node 1022, a 23rd node 1023, a 24th node 1024, and a 25th node 1025, a 26th node 1026, a 27th node 1027, a 28th node 1028, a 29th node 1029, a 30th node 1030, a 31st node 1031, a 32nd node 1032 and a 33rd node 1033 with the bit level of 6. The number of the nodes and the level of the search tree 1000 may vary based on the code length or according to the code length.

According to an embodiment, the nodes included in the search tree 1000 each may correspond to a single bit.

For example, the first node 1001 may correspond to a first bit which is the frozen bit. The second node 1002 may correspond to a second bit which is the frozen bit. The third node 1003 may correspond to a third bit. The fourth node 1004 and the fifth node 1005 may correspond to a fourth bit. The sixth node 1006, the seventh node 1007, the eighth node 1008, and the ninth node 1009 may correspond to a fifth bit. The tenth node 1010, the 11th node 1011, the 12th node 1012, the 13th node 1013, the 14th node 1014, the 15th node 1015, the 16th node 1016, and the 17th node 1017 may correspond to a sixth bit. The 18th node 1018, the 19th node 1019, the 20th node 1020, the 21st node 1021, the 22nd node 1022, the 23rd node 1023, the 24th node 1024, the 25th node 1025, the 26th node 1026, the 27th node 1027, the 28th node 1028, the 29th node 1029, the 30th node 1030, the 31st node 1031, the 32nd node 1032, and the 33rd node 1033 may correspond to a seventh bit.

According to an embodiment, the third node 1003 may be a root node. The plurality of the nodes in the search tree 1000 may be connected by a path (or, paths).

According to an embodiment, the receiving node 420 may perform the decoding according to a depth first search (DFS) scheme or algorithm. For example, the successive cancellation decoding block 421 and the tree search block 422 of the receiving node 420 may perform the decoding according to the DFS scheme. In an embodiment, the DFS scheme may be referred to as a search scheme which searches first the depth in the search tree scheme. For example, the DFS scheme may be referred to as a scheme which starts at the root node (e.g., the third node 1003) or an arbitrary node, searches to a maximum depth (e.g., the bit level of 6) and then backtracks to search for another node.

While FIG. 10 of the disclosure is described based on the DFS scheme, this is only an example. For example, the receiving node 420 may perform the decoding with the search tree scheme using a breadth first search (BFS) scheme. The BFS scheme may be referred to as a width-first search scheme.

According to an embodiment, the receiving node 420 may not decode the first bit and the second bit corresponding to the frozen bits. For example, the first bit and the second bit may correspond to the frozen bits which are set to 0, and the paths of the first node 1001 corresponding to the first bit and the second node 1002 corresponding to the second bit may be one.

According to an embodiment, the receiving node 420 may decode the third bit which corresponds to the information bit among the plurality of the bits, and determine the search path to the fourth node 1004 in case that the third bit is determined to 0 as a result of decoding the third bit. As another example, in case that the third bit is determined to 1 as a result of decoding the third bit, the receiving node 420 may determine the search path to the fifth node 1005.

According to an embodiment, the receiving node 420 may decode the fourth bit corresponding to the information bit among the plurality of the bits, and determine the search path to the sixth node 1006 in case that the fourth bit is determined to zero as a result of decoding the fourth bit. Similarly, the receiving node 420 may decode the fifth bit which corresponds to the information bit among the plurality of the bits. In case that the fifth bit is determined to 0 as a result of decoding the fifth bit, the receiving node 420 may determine the search path to the tenth node 1010.

According to an embodiment, as the search path is determined from the sixth node 1006 to the tenth node 1010, a first reliability test 1051 and a second reliability test 1052 described in FIG. 5 through FIG. 9 may be performed.

According to an embodiment, the receiving node 420 may perform the first reliability test 1051. For example, the receiving node 420 may estimate a bit value of the fifth bit which is the information bit, as the first estimation bit value (e.g., 0) as in operation 701 (or, operation 502). The receiving node 420 may determine whether the LLR for the fifth bit is included in the first interval as in operation 503, and in case that the LLR is included in the first interval, the receiving node 420 may determine the bit value of the fifth bit by comparing the reliability value and at least one threshold.

In an example, the receiving node 420 may determine the bit value of the fifth bit as the first bit value (e.g., 0) in case that the LLR for the fifth bit is included in the second interval as in operation 507, and the receiving node 420 may determine the bit value of the fifth bit as the second bit value (e.g., 1) in case that the LLR for the fifth bit is included in the third interval.

According to an embodiment, the receiving node 420 may perform the second reliability test 1052. For example, the receiving node 420 may determine the bit value of the first information bit based on the first reliability value determined based on the LLR in case that the LLR for the fifth bit is included in the first interval as in operation 505.

While the disclosure describes that the second reliability test 1052 is performed after the first reliability test 1051, this is merely an example. For example, to reduce the time taken for the decoding, the second reliability test 1052 may be omitted and only the first reliability test 1051 may be conducted. In another example, to increase the decoding reliability, both the first reliability test 1051 and the second reliability test 1052 may be performed.

According to an embodiment, the receiving node 420 may reduce or minimize the time and the computational resources consumed to perform the decoding through the first reliability test 1051. For example, in case that the receiving node 420 does not perform the decoding through the first reliability test 1051, the receiving node 420 may need to separate the first reliability value or the second reliability value from the LLR of the fifth bit. By contrast, in case that the receiving node 420 performs only the first reliability test 1051 and the LLR is not included in the first interval but is included in the second interval or the third interval, the receiving node 420 may determine the bit value of the fifth bit without computing the separate first reliability value or second reliability value. In addition, the receiving node 420 may determine the bit value of the fifth bit by comparing the reliability value determined based on the LLR with the at least one threshold without the LLR separation, even if the LLR is included in the first interval. In conclusion, the receiving node 420 may reduce or minimize the time and the computational resources consumed for decoding by performing the first reliability test 1051.

According to an embodiment, the receiving node 420 may reduce or minimize the time and the computational resources consumed to perform the decoding through the first reliability test 1051 and the second reliability test 1052. For example, the receiving node 420 may increase the reliability of the decoding result of the fifth bit by performing both the first reliability test 1051 and the second reliability test 1052. Increasing the reliability of the decoding result may be referred to as substantially mitigating the latency in the Fano decoding of the search tree scheme.

For example, in the Fano decoding of the search tree scheme, in case that the determined bit value is not justified or accurate, the receiving node 420 may need to return to (or, backward) the third node 1003 which corresponds to the root node to perform the decoding. By contrast, the receiving node 420 according to an embodiment may increase the reliability of the decoding result by conducting both the first reliability test 1051 and the second reliability test 1052, thus preventing or reducing returning to the first node 1001 or a previous node. Hence, the receiving node 420 may minimize or reduce the reliability and the latency by performing both the first reliability test 1051 and the second reliability test 1052.

Although the disclosure describes that the receiving node 420 performs the first reliability test 1051 and/or the second reliability test 1052 based on the fifth bit, this is only an example. The description of FIG. 5 in the disclosure may be also applied to each of the information bits (e.g., the third bit through the seventh bit).

Figure 11A:
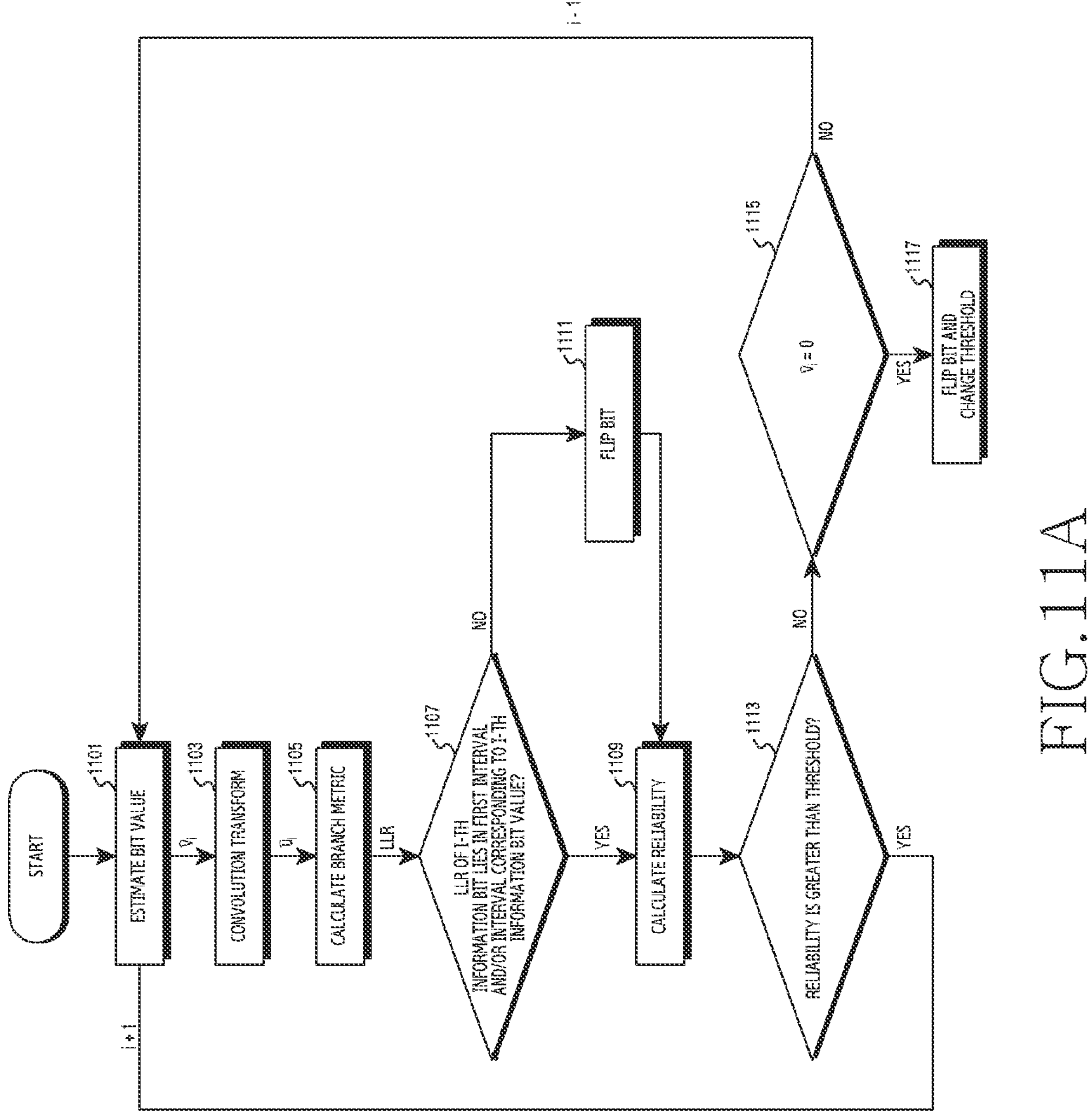
FIG. 11A illustrates a diagram of a method for determining a bit value of an information bit according to an embodiment of the disclosure.

FIG. 11A illustrates a diagram of a method for determining a bit value of an information bit according to an embodiment of the disclosure.

Referring to FIG. 11A, the receiving node 420 according to an embodiment may estimate a bit value of an i-th information bit of at least one information bit in operation 1101. For example, the receiving node 420 may estimate the bit value of the i-th information bit as 0 or 1. For example, the estimation bit value of the estimated i-th information bit may be $\hat{v}_i$.

According to an embodiment, the i-th estimation bit value estimated by the receiving node 420 in operation 1101 may not be a definitive bit value, and the estimation bit value and the bit value finally determined by the receiving node 420 as the bit value of the i-th information bit may be identical or different.

According to an embodiment, the receiving node 420 may perform the convolution transform on the estimation bit value $\hat{v}_i$ of the i-th information bit of the i-th information bit in operation 1103. For example, the estimation bit value of the i-th information bit convolutionally transformed may be $\hat{u}_i$.

According to an embodiment, the receiving node 420 may calculate a branch metric in operation 1105. For example, the receiving node 420 may calculate an LLR corresponding to the branch metric based on the reliability of the codeword received from the transmitting node 410. For example, the LLR for the i-th information bit may be $LLR_i$.

According to an embodiment, the receiving node 420 may determine in operation 1107 whether the LLR of the i-th information bit lies in the first interval 901 and/or an interval corresponding to the i-th information bit value. For example, the receiving node 420 may determine whether the bit value of the i-th information bit lies in the first interval 901.

As another example, in case that the bit value of the i-th information bit is estimated as the first estimation bit value (e.g., 0) in operation 1101, the receiving node 420 may determine whether the bit value of the i-th information bit lies in the first interval 901 and the second interval 902.

As yet another example, in case that the bit value of the i-th information bit is estimated as the second estimation bit value (e.g., 1) in operation 1101, the receiving node 420 may determine whether the bit value of the i-th information bit lies in the first interval 901 and the third interval 903.

According to an embodiment, in case that the LLR lies in the first interval 901 and/or the interval corresponding to the i-th information bit value, the receiving node 420 may calculate a reliability value of the bit value of the i-th information bit in operation 1109. For example, the receiving node 420 may calculate a PM value of the i-th information bit.

According to an embodiment, the receiving node 420 may identify the reliability (or, the PM value) based on the LLR of the i-th information bit. For example, in case that i is 1 (or, the first information bit), a first reliability (or, a first PM value) may be equal to a first LLR. For example, in case that i is 2 (or, the second information bit), a second reliability (or, a second PM value) may be the sum of the first LLR and a second LLR. In an example, the second LLR may be an LLR corresponding to the second information bit.

For example, in case that i is 3 (or, the third information bit), a third reliability (or, a third PM value) may be the sum of the first LLR, the second LLR, and a third LLR. In an example, the third LLR may be an LLR corresponding to the third information bit.

That is, the PM value (e.g., an i-th PM value) corresponding to the i-th information bit may be obtained based on [Equation 6].

$$PM_i = PM_{i-1} + LLR_i \quad \text{[Equation 6]}$$

According to an embodiment, in case that the LLR does not lie in the first interval and/or the interval corresponding to the i-th information bit value, the receiving node 420 may flip the bit in operation 1111. For example, in case that the estimation bit value is 0, the receiving node 420 may change or flip the estimation bit value of the i-th information bit to 1. For example, in case that the estimation bit value estimated in operation 1101 is 1, the receiving node 420 may change or flip the estimation bit value of the i-th information bit to 0.

According to an embodiment, in case that the estimation bit value of the i-th information bit is changed or flipped to 1, the receiving node 420 may calculate a reliability corresponding to the i-th information bit in operation 1109.

According to an embodiment, the receiving node 420 may determine in operation 1113 whether the reliability (or, the PM value) for the i-th information bit is greater than the first threshold. For example, the receiving node 420 may determine whether the i-th PM (e.g., $PM_i$) of the i-th information bit is greater than the first threshold (e.g., $\Delta_{i-1}$).

According to an embodiment, in case that the reliability (or, the PM value) of the i-th information bit is greater than the first threshold, the receiving node 420 may determine the bit value of the i-th information bit as the estimation bit value.

For example, in case that the PM for the i-th information bit is greater than the first threshold, the receiving node 420 may determine the bit value of the i-th information bit as the estimation bit value estimated in operation 1101. However, in case that the estimation bit value (e.g., 0) is flipped in operation 1111, the receiving node 420 may determine the flipped estimation bit value (e.g., 1) as the bit value of the i-th information bit.

According to an embodiment, after finally determining the bit value of the i-th information bit, the receiving node 420 may return to operation 1101 to determine the bit value of an i+1-th information bit.

According to an embodiment, in case that the PM of the i-th information bit is greater than the first threshold (e.g., $\Delta_{i-1}$), the receiving node 420 may determine in operation 1115 whether the estimation bit value of the i-th information bit is 0.

According to an embodiment, in case that the bit value estimated as the bit value of the i-th information bit is 0, the receiving node 420 may flip the estimated bit value (e.g., 0) to other bit value (e.g., 1), and change the first threshold to the first adjusted threshold in operation 1117.

Figure 11B:
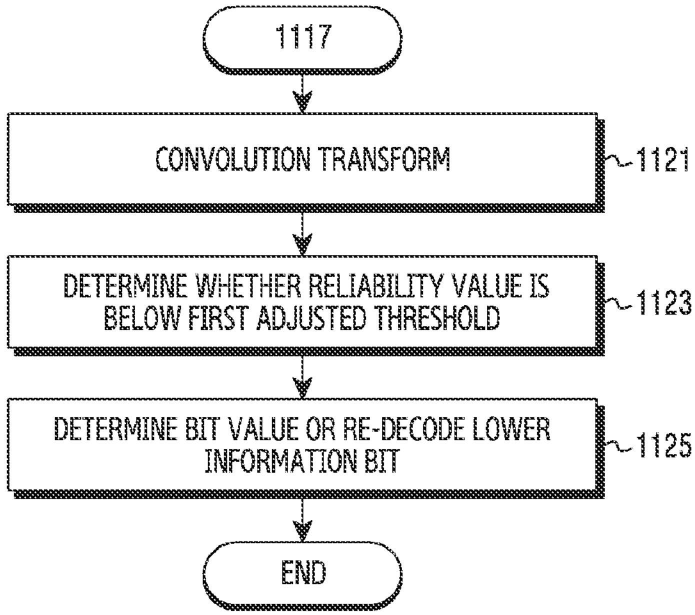
FIG. 11B illustrates a diagram of a method for comparing an LLR and a first adjusted threshold with respect to a flipped bit according to an embodiment of the disclosure.

The operation of the receiving node 420 for determining the bit value of the first information bit using the flipped bit value (e.g., 1) and the first adjusted threshold shall be elucidated in FIG. 11B.

According to an embodiment, in case that the bit value estimated as the bit value of the i-th information bit is 1, the receiving node 420 may go backward to an i-1-th information bit. For example, the receiving node 420 may perform operation 1101 through operation 1113 for both cases in which the bit value of the i-th information bit is 0 and 1, and the receiving node 420 may return to the i-1-th information bit in case that the reliability test is conducted for the bit value which is 0 and 1 but does not yield a satisfying result.

In the disclosure, operation 1107 may correspond to the first reliability test 1051 using the LLR, and operations 1109 and 1113 may correspond to the second reliability test 1052 using the reliability value determined based on the LLR.

Estimating the bit value of operation 1101 described in FIG. 11 of the disclosure may substantially correspond to estimating the bit value of the first information bit in operation 701 of FIG. 7. Convolutionally transforming the bit value of the i-th information bit in operation 1103 of FIG. 11 in the disclosure may substantially correspond to convolutionally transforming the bit value of the first information bit in operation 703 of FIG. 7.

Operation 1105 illustrated in FIG. 11 of the disclosure may be performed between operation 703 of FIG. 7 and operation 501. Operation 1107 described in FIG. 11 of the disclosure may correspond to operation 503 of FIG. 5. Operation 1109 and operation 1113 described in FIG. 11 of the disclosure may correspond substantially to operation 803 or operation 805 of FIG. 8. In conclusion, the embodiment of FIG. 11 of the disclosure may be combined with the embodiment of FIG. 5 and/or the embodiment of FIG. 8.

However, the order and the correspondence of the operations mentioned above are illustrative only and the disclosure is not limited thereto.

FIG. 11A of the disclosure has described that both the first reliability test and the second reliability test are performed, but the second reliability test may be omitted optionally. Hereinafter, FIG. 12 describes an embodiment in which the second reliability test is omitted in case that the i-th information bit does not lie in the first interval.

FIG. 11B illustrates a diagram of a method for comparing an LLR of a flipped bit and an adjusted threshold according to an embodiment of the disclosure.

Referring to FIG. 11B, the receiving node 420 according to an embodiment may convolutionally transform the flipped estimation bit value (e.g., 1) in operation 1121. For example, the receiving node 420 may perform the convolution transform on the flipped estimation bit value (e.g., 1) in substantially the same manner as the convolution transform performed on the estimation bit value (e.g., 0) in operation 1103 of FIG. 11A.

According to an embodiment, the receiving node 420 may determine in operation 1123 whether the reliability value is below the first adjusted threshold. For example, the receiving node 420 may determine whether the reliability value for the first information bit is below the first adjusted threshold.

For example, the reliability value for the first information bit used in operation 1123 may be the reliability value obtained in operation 1109 of FIG. 11A. For example, the first adjusted threshold may be greater than the first threshold by a designated value.

According to an embodiment, the receiving node 420 may determine the bit value of the first information bit based on the determination result, or re-decode an information bit lower than the first information bit in operation 1125.

For example, in case that the reliability value is below the first adjusted threshold, the receiving node 420 may determine the bit value of the first information bit as the flipped estimation bit value (e.g., 1). For example, in case that the reliability value is greater than the first adjusted threshold, the receiving node 420 may re-decode the second information bit having the lower bit level than the first information bit.

Figure 12:
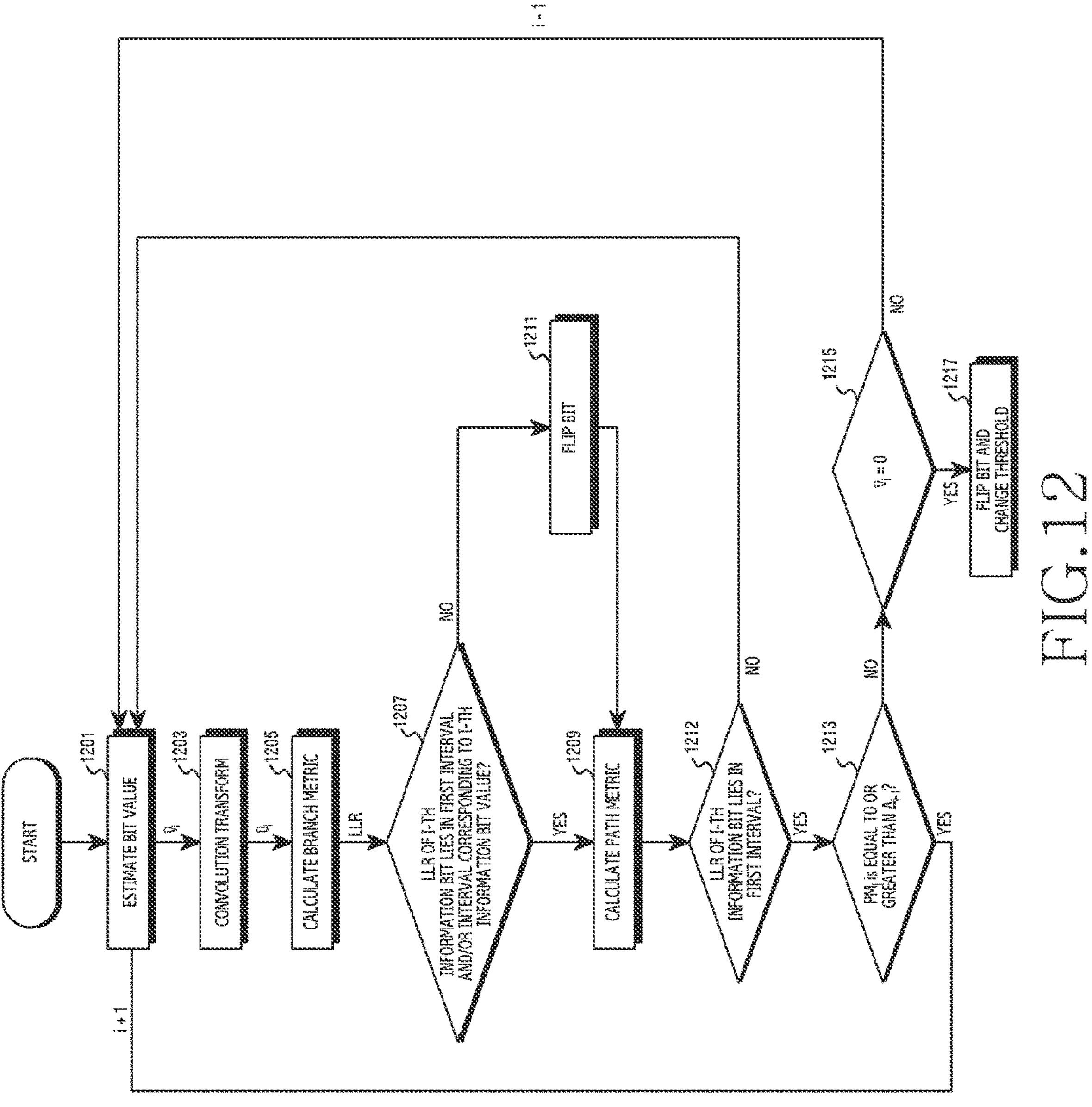
FIG. 12 illustrates a diagram of a method for determining a bit value of an information bit according to an embodiment of the disclosure.

FIG. 12 illustrates a diagram of a method for determining a bit value of an information bit according to an embodiment of the disclosure.

Referring to FIG. 12, according to an embodiment, operation 1201, operation 1203, operation 1205, operation 1207, operation 1209, operation 1211, operation 1213, operation 1215, and operation 1217 of FIG. 12 may correspond to operations 1101, operation 1103, operation 1105, operation 1107, operation 1109, operation 1111, operation 1113, operation 1115, and operation 1117 of FIG. 11A in order. Accordingly, description on operation 1201, operation 1203, operation 1205, operation 1207, operation 1209, operation 1211, operation 1213, operation 1215, and operation 1217 of FIG. 12 may be subject to operation 1101, operation 1103, operation 1105, operation 1107, operation 1109, operation 1111, operation 1113, operation 1115, and operation 1117 of FIG. 11A respectively, unless indicated otherwise.

Unlike FIG. 11A, the receiving node 420 may determine in operation 1212 whether the LLR for the i-th information bit lies in the first interval 901 in FIG. 12.

According to an embodiment, in case that the LLR for the i-th information bit does not lie in the first interval 901 in operation 1212, the receiving node 420 may determine the bit value of the i-th information bit without the second reliability test. For example, in case that the LLR for the i-th information bit lies in the second interval 902, the receiving node 420 may determine the bit value of the i-th information bit as 0. For example, in case that the LLR for the i-th information bit lies in the third interval 903, the receiving node 420 may determine the bit value of the i-th information bit as 1.

According to an embodiment, the receiving node 420 may minimize or reduce the time and/or the computational resources consumed for the decoding by determining the bit value of the i-th information bit without the second reliability test.

Figure 13:
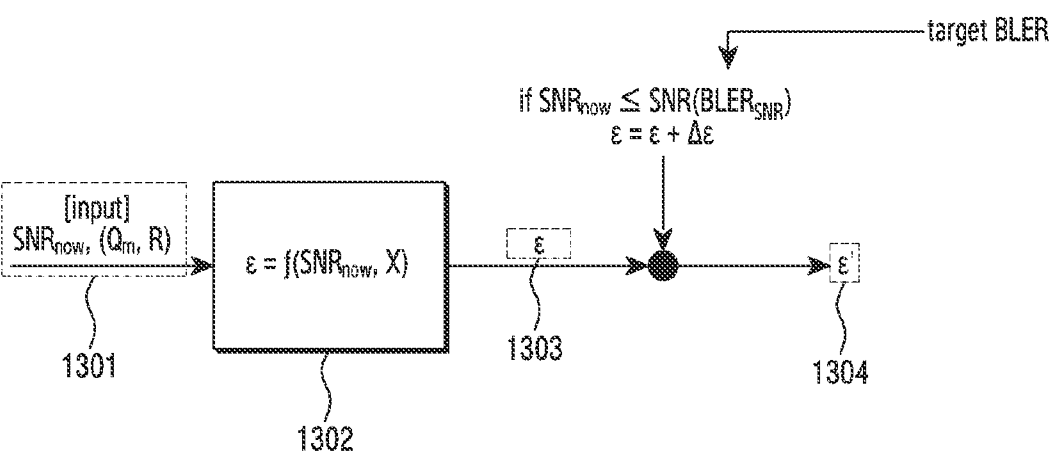
FIG. 13 illustrates a diagram of a method for determining a first set value according to an embodiment of the disclosure.

FIG. 13 illustrates a diagram of a method for determining a first set value according to an embodiment of the disclosure.

Referring to FIG. 13, the receiving node 420 according to an embodiment may determine the first set value (e.g., ε) based on at least one of the SNR, the modulation order, or the code rate indicating the proportion of the at least one information bit in the codeword.

According to an embodiment, the receiving node 420 includes a memory, and may determine the first set value (e.g., ε) by using a look-up table included in the memory. For example, the receiving node 420 may identify the SNR indicative of the channel state between the transmitting node 410 and the receiving node 420, and determine the first set value of the first interval corresponding to the identified SNR based on the look-up table stored in the memory.

For example, the receiving node 420 may apply input data 1301 including the SNR, the modulation order or the modulation scheme $Q_m$ and/or the code rate at the time of receiving the codeword, to a function 1302 which outputs the first set value (e.g., ε). In an example, the receiving node 420 may obtain a first set value 1303 (e.g., ε).

According to an embodiment, in case that the identified SNR is lower than a minimum SNR (e.g., SNR($BLER_{SNR}$)) for a target block error rate (BLER), the receiving node 420 may determine or change the first set value based on the minimum SNR. For example, in case that the SNR indicating the channel state with the transmitting node 410 is lower than the minimum SNR (e.g., SNR($BLER_{SNR}$)) for the target BLER, the receiving node 420 may change the first set value 1303 (e.g., ε) to a first adjusted set value 1304 (e.g., ε').

According to an embodiment, the minimum SNR (e.g., SNR($BLER_{SNR}$)) may be obtained from a modulation and coding scheme (MCS) index of downlink control information (DCI).

According to an embodiment, a method is performed by a receiving node in a wireless communication system. The method may include receiving, from a transmitting node, a codeword including at least one information bit, estimating a bit value of a first information bit of the at least one information bit as a first estimation bit value, determining whether an LLR indicating a probability ratio between bit values estimated as the bit value of the first information bit is included in a first interval, in case that the LLR is included in the first interval, determining the bit value of the first information bit as the first estimation bit value or a second estimation bit value that is different from the first estimation bit value, by comparing a reliability value determined based on the LLR with at least one threshold, and in case that the LLR is not included in the first interval, determining the bit value of the first information bit as the first estimation bit value or the second estimation bit value based on the LLR.

According to an embodiment, determining the bit value of the first information bit as the first estimation bit value or the second estimation bit value by comparing the reliability value determined based on the LLR with the at least one threshold may include comparing the reliability value and a first threshold, and in case that the reliability value is equal to or greater than the first threshold, determining the first estimation bit value as the bit value of the first information bit.

According to an embodiment, determining the bit value of the first information bit as the first estimation bit value or the second estimation bit value by comparing the reliability value determined based on the LLR with the at least one threshold may further include, in case that the reliability value is smaller than the first threshold, comparing the LLR and a first adjusted threshold, and in case that the reliability value is below the first adjusted threshold, determining the second estimation bit value as the bit value of the first information bit.

According to an embodiment, the method may further include, in case that the reliability value is greater than the first adjusted threshold, re-decoding a second information bit having a lower bit level than the first information bit among the at least one information bit.

According to an embodiment, the first adjusted threshold may be greater than the first threshold.

According to an embodiment, determining the bit value of the first information bit based on the LLR in case that the LLR is not included in the first interval may include, in case that the LLR is included in a second interval higher than the first interval, determining the bit value of the first information bit as the first estimation bit value, and in case that the LLR is included in a third interval lower than the first interval, determining the bit value of the first information bit as the second estimation bit value that is different from the first estimation bit value.

According to an embodiment, the first estimation bit value may be 0, and the second estimation bit value may be 1.

According to an embodiment, the method may further include, in case that bit value of the first information bit is determined as the first estimation bit value, comparing the reliability value determined based on the LLR with a first threshold, in case that the bit value of the first information bit is determined as the second estimation bit value, comparing the reliability value determined based on the LLR with a second threshold, and determining the bit value of the first information bit based on a comparison result of the reliability value and the first threshold or a comparison result of the reliability value and the second threshold.

According to an embodiment, the first interval may include an interval where the LLR is between a first set value and a second set value having an opposite value to the first set value. A second interval may correspond to the first estimation bit value, and include an interval where the LLR is greater than or equal to the first set value. A third interval may correspond to the second estimation bit value, and include an interval where the LLR is smaller than or equal to the second set value.

According to an embodiment, the first set value of the first interval may be determined based on at least one of an SNR, a modulation order, or a code rate indicating a proportion of the at least one information bit in the codeword.

According to an embodiment, the method may further include identifying the SNR that indicates a channel state between the transmitting node and the receiving node, and determining the first set value of the first interval corresponding to the identified SNR, based on a stored look-up table.

According to an embodiment, the method may further include identifying the SNR that indicates a channel state between the transmitting node and the receiving node, and in case that the identified SNR is lower than a minimum SNR for a target block error rate (BLER), determining the first set value based on the minimum SNR.

According to an embodiment, the minimum SNR may be obtained from an MCS index of DCI.

According to an embodiment, the method may further include performing convolution transform on the first estimation bit value.

According to an embodiment, a receiving node in a wireless communication system may be provided. The receiving node may include a transceiver and a controller coupled with the transceiver. The controller may be configured to receive, from a transmitting node, a codeword including at least one information bit, estimate a bit value of a first information bit of the at least one information bit as a first estimation bit value, determine whether an LLR indicating a probability ratio between bit values estimated as the bit value of the first information bit is included in a first interval, in case that the LLR is included in the first interval, determine the bit value of the first information bit as the first estimation bit value or a second estimation bit value that is different from the first estimation bit value, by comparing a reliability value determined based on the LLR with the at least one threshold, and in case that the LLR is not included in the first interval, determine the bit value of the first information bit as the first estimation bit value or the second estimation bit value based on the LLR.

According to an embodiment, the controller may be configured to compare the reliability value and a first threshold, and in case that the reliability value is equal to or greater than the first threshold, determine the first estimation bit value as the bit value of the first information bit.

According to an embodiment, the controller may be configured to, in case that the reliability value is smaller than the first threshold, compare the LLR and a first adjusted threshold, and in case that the reliability value is below the first adjusted threshold, determine the second estimation bit value as the bit value of the first information bit.

According to an embodiment, the controller may be configured to, in case that the reliability value is greater than the first adjusted threshold, re-decode a second information bit having a lower bit level than the first information bit among the at least one information bit.

According to an embodiment, the controller may be configured to, in case that the LLR is included in a second interval higher than the first interval, determine the bit value of the first information bit as the first estimation bit value, and in case that the LLR is included in a third interval lower than the first interval, determine the bit value of the first information bit as the second estimation bit value that is different from the first estimation bit value.

According to an embodiment, the controller may be configured to, in case that determining the bit value of the first information bit as the first estimation bit value, compare the reliability value determined based on the LLR with a first threshold associated with the first estimation bit value, in case that determining the bit value of the first information bit as the second estimation bit value, compare the reliability value determined based on the LLR with a second threshold associated with the second estimation bit value, and determine the bit value of the first information bit based on a comparison result of the reliability value and the first threshold or a comparison result of the reliability value and the second threshold.

Meanwhile, the present specification and the drawings disclose the preferred embodiment of the disclosure, and specific terms are used, which are merely used in a general sense to easily explain the technical details of the disclosure and to help the understanding of the disclosure, not to limit the scope of the disclosure. It will be apparent to those skilled in the art that other modifications based on the technical idea of the disclosure may be carried out in addition to the embodiments disclosed herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a receiving node, the method comprising:

receiving, from a transmitting node, a codeword comprising a plurality of information bits;

estimating a bit value of a first information bit among the plurality of information bits as a first estimation bit value corresponding to 0 or 1;

determining whether a log-likelihood ratio (LLR) of the first information bit falls within a first range, wherein the LLR is a ratio of a probability that the bit value is 0 to a probability that the bit value is 1;

in case that the LLR falls within the first range:

identifying whether a reliability value of the LLR is equal to or greater than a first threshold;

in case that the reliability value is equal to or greater than the first threshold, determining the bit value as the first estimation bit value;

in case that the reliability value is less than the first threshold, comparing the reliability value and a first adjusted threshold;

in case that the reliability value is less than the first adjusted threshold, determining the bit value as a second estimation bit value different from the first estimation bit value;

in case that the reliability value is equal to or greater than the first adjusted threshold, re-decoding a second information bit having a lower bit level than the first information bit among the plurality of information bits in case that the LLR falls within a second range indicating the bit value is 0, determining the bit value of the first information bit as 0; and in case that the LLR falls within a third range indicating the bit value is 1, determining the bit value of the first information bit as 1, wherein the second range is higher than the first range and the third range is lower than the first range, and wherein the reliability value of the LLR is determined based on a sum of the LLR and at least one LLR of at least one information bit having the lower bit level than the first information bit among the plurality of information bits.

2. The method of claim 1, wherein the first adjusted threshold is lower than the first threshold.

3. The method of claim 1, wherein the first range comprises values between the second range and the third range.

4. The method of claim 3, wherein a value dividing the first range and the second range is determined based on at least one of a signal-to-noise ratio (SNR), a modulation order, or a code rate indicating a proportion of the plurality of information bits.

5. The method of claim 4, further comprising:

identifying an SNR that indicates a channel state between the transmitting node and the receiving node; and determining the value dividing the first range and the second range corresponding to the identified SNR, based on a stored look-up table.

6. The method of claim 4, further comprising:

identifying an SNR that indicates a channel state between the transmitting node and the receiving node; and in case that the identified SNR is lower than a minimum SNR for a target block error rate (BLER), determining the value dividing the first range and the second range based on the minimum SNR.

7. The method of claim 6, wherein the minimum SNR is obtained from a modulation and coding scheme (MCS) index of downlink control information (DCI).

8. The method of claim 1, further comprising:

performing convolution transform on the first estimation bit value.

9. A receiving node comprising:

at least one transceiver;

at least one processor communicatively coupled to the at least one transceiver; and at least one memory, communicatively coupled to the at least one processor, storing instructions executable by the at least one processor individually or in any combination to cause the receiving node to:

receive, from a transmitting node, a codeword comprising a plurality of information bits;

estimate a bit value of a first information bit among the plurality of information bits as a first estimation bit value corresponding to 0 or 1;

determine whether a log-likelihood ratio (LLR) of the first information bit falls within a first range, wherein the LLR is a ratio of a probability that the bit value is 0 to a probability that the bit value is 1;

in case that the LLR falls within the first range:

identify whether a reliability value of the LLR is equal to or greater than a first threshold;

in case that the reliability value is equal to or greater than the first threshold, determine the bit value as the first estimation bit value;

in case that the reliability value is less than the first threshold, compare the reliability value and a first adjusted threshold;

in case that the reliability value is less than the first adjusted threshold, determine the bit value as a second estimation bit value different from the first estimation bit value;

in case that the reliability value is equal to or greater than the first adjusted threshold, re-decode a second information bit having a lower bit level than the first information bit among the plurality of information bits in case that the LLR falls within a second range indicating the bit value is 0, determine the bit value of the first information bit as 0; and in case that the LLR falls within a third range indicating the bit value is 1, determine the bit value of the first information bit as 1, wherein the second range is higher than the first range and the third range is lower than the first range, and wherein the reliability value of the LLR is determined based on a sum of the LLR and at least one LLR of at least one information bit having the lower bit level than the first information bit among the plurality of information bits.

10. The receiving node of claim 9, wherein the first range comprises values between the second range and the third range.

11. The receiving node of claim 10, wherein a value dividing the first range and the second range is determined based on at least one of a signal-to-noise ratio (SNR), a modulation order, or a code rate indicating a proportion of the plurality of information bits.

* * * * *